United States Patent
Martelli et al.

(10) Patent No.: US 8,311,411 B2
(45) Date of Patent: Nov. 13, 2012

(54) METHOD AND DEVICE FOR POLARIZATION OF AN OPTICAL RADIATION

(75) Inventors: Paolo Martelli, Milan (IT); Mario Martinelli, Milan (IT); Aldo Righetti, Milan (IT)

(73) Assignee: Google Inc., Mountain View, CA (US)

( * ) Notice: Subject to any disclaimer, the term of this patent is extended or adjusted under 35 U.S.C. 154(b) by 385 days.

(21) Appl. No.: 12/739,840

(22) PCT Filed: Dec. 21, 2007

(86) PCT No.: PCT/IB2007/055292
§ 371 (c)(1),
(2), (4) Date: Jul. 1, 2010

(87) PCT Pub. No.: WO2009/081237
PCT Pub. Date: Jul. 2, 2009

(65) Prior Publication Data
US 2010/0277798 A1 Nov. 4, 2010

(51) Int. Cl.
*H04B 10/00* (2006.01)
*H04B 10/06* (2006.01)
*H04B 10/04* (2006.01)
*H04J 14/06* (2006.01)

(52) U.S. Cl. .......... 398/65; 398/152; 398/201; 398/206; 398/207; 398/212

(58) Field of Classification Search .......... 398/65, 398/152, 201, 205, 206, 207, 212
See application file for complete search history.

(56) References Cited

U.S. PATENT DOCUMENTS
7,466,471 B2 * 12/2008 Yao ................................ 359/259
2006/0291868 A1 * 12/2006 Yee et al. ...................... 398/152

FOREIGN PATENT DOCUMENTS
WO WO 2005/064385 A1 7/2005
WO WO 2006/027205 A1 3/2006
WO WO 2006/045324 A 5/2006

OTHER PUBLICATIONS
Martinelli, M., et al., "Polarization Stabilization in Optical Communications Systems," Journal of Lightwave Technology, 24(11):4172-4183 (2006).

(Continued)

*Primary Examiner* — Dalzid Singh
(74) *Attorney, Agent, or Firm* — Honigman Miller Schwartz and Cohn LLP

(57) ABSTRACT

A method of stabilizing the state of polarization of an optical radiation comprises: 1) applying sequentially to the optical radiation a first and a second controllable phase retardation; 2) detecting an optical power of at least a first polarized portion of the optical radiation obtained after step 1; 3) applying sequentially to the optical radiation obtained after step 1 a third and a fourth controllable phase retardation; 4) detecting an optical power of a further polarized portion of the optical radiation obtained after step 3; 5) controlling, responsive to the optical power of said first polarized portion, the second controllable phase retardation so as to maintain the polarization state of the optical radiation obtained after step 1 at a defined great circle r on a Poincare sphere; 6) in case the second controllable phase retardation reaches a first limit value, commuting the first controllable phase retardation between first and second values; 7) controlling, responsive to the optical power of said further polarized portion, the fourth controllable phase retardation so as to maintain the polarization state of the optical radiation obtained after step 3 at a defined state of polarization; 8) in case the fourth controllable phase retardation reaches a second limit value, commuting the third controllable phase retardation between third and fourth values, keeping constant the first controllable phase retardation while the third controllable phase retardation is commuting between said third and fourth values. A polarization stabilizing device based on the method above is also disclosed.

43 Claims, 10 Drawing Sheets

OTHER PUBLICATIONS

Pikaar, T., et al., "Nondeterministic Endless Control System for Active Polarization Control," Journal of Lightwave Technology, 7(12):1982-1987 (1989).

International Search Report mailed Sep. 15, 2008, for PCT/IB2007/055292 (3 pages).

* cited by examiner

METHOD AND DEVICE FOR POLARIZATION OF AN OPTICAL RADIATION

Related Application

This application is the U.S. National Stage of International Application No. PCT/IB2007/055292, filed Dec. 21, 2007, which designates the U.S., published in English. The entire teachings of the above application are incorporated herein by reference.

FIELD OF THE INVENTION

The invention relates to polarization stabilization, more especially to devices and methods for stabilizing with a high accuracy and a high speed the polarization state of an optical radiation of arbitrary, typically time variant, polarization.

BACKGROUND OF THE INVENTION

A polarization stabilizer is a device that transforms an input optical radiation having an arbitrary input state of polarization (SOP) into an output optical radiation with a predetermined SOP (typically but not necessarily fixed) and with an optical power, both not dependent on the input SOP (i.e. the ratio between output and input optical power is independent of the input SOP). In general, a defined SOP is determined by two parameters: the ellipticity and the polarization azimuth.

In optical communication systems, such a device is useful, for example, placed immediately before (upstream) a polarization sensitive optical component for compensating the random SOP fluctuations of an optical radiation after a link made of, e.g., single-mode optical fibers. Examples of SOP sensitive optical components are integrated-optics components, coherent optical receivers (wherein a match is sought between the SOP of the signal and the local oscillator), fiber optic interferometric sensors, polarization mode dispersion compensators (wherein an alignment is sought of the two orthogonal output principal states of polarization with respect to a variable delay line introducing a delay between two fixed SOP) and the like.

In polarization division multiplexing (PolDM) transmission systems, at least two channels are launched orthogonally polarized in the optical transmission medium, such as for example an optical transmission fiber. In a typical solution for PolDM transmission, the at least two channels orthogonally polarized are closely spaced, such as for example within 50 GHz spacing or within 25 GHz spacing. In a preferred configuration, the two channels have substantially the same optical wavelength. Typically, while the reciprocal orthogonality of polarization is substantially preserved along the propagation into the transmitting medium, the SOPs of the two channels randomly fluctuate in time at a given position along the line, such as for example at the receiver section.

In PolDM, whenever the two orthogonally polarized channels have to be polarization demultiplexed, typically a polarization beam splitter is used as a demultiplexer, which is apt to split two orthogonal SOPs. In such an application, exact polarization stabilization of the SOPs of the two channels is strongly desired, in order to facilitate polarization demultiplexing. In case of an error in polarization locking, a misalignment occurs between the SOPs of the two channels and those of the demultiplexer. In this case a cross-talk is generated due to an interference between a channel and the small portion of the other non-extinguished channel, which severely degrades the quality of the received signal.

A fundamental requirement of a polarization stabilizer is the endlessness in control, meaning that the stabilizer must compensate in a continuous way for the variations of input SOP.

Several polarization control schemes based on finite range components have been presented. In such schemes, in order to achieve an endless control, it is necessary to provide a reset procedure when a component reaches its range limit so that the output SOP does not change during the reset. Generally, reset procedures can be problematic in that they are often associated with complex control algorithms designed to avoid loss of feedback control during the reset.

WO03/014811 patent application, which is herein incorporated by reference, discloses an endless polarization stabilizer based on a two-stage configuration wherein the two stages are controlled independently by an endless polarization stabilizing method based on a feedback control algorithm. Each stage comprises a pair of birefringent components that each have fixed eigenaxes and variable phase retardation. The two birefringent components are variable retarders with finite birefringence range and respective eigenaxes oriented at approximately ±45 degrees relative to each other. The endlessness is obtained by commuting the phase retardation of one retarder, when the retardation of the other retarder reaches a range limit.

WO06/027205 patent application, which is herein incorporated by reference, discloses an endless polarization stabilizer based on a two-stage configuration wherein the two stages are controlled independently by an endless polarization stabilizing method based on a feedback control algorithm. Each stage comprises a pair of variable rotators, each having fixed eigenstates and variable phase retardation, and an optically interposed quarter-wave plate, and a controller configured for switching between first and second values the phase retardation of the first of the variable rotators, whenever the phase retardation of the second of the variable rotators reaches an upper or a lower limit. The upper and lower limits of the second rotator and the first and second values of the first rotator are chosen so that discontinuities in the power of the output optical radiation are avoided when the first variable rotator is switched, thereby providing endless polarization stabilization using rotators that themselves may have limited retardation ranges.

The article "Polarization control in advanced optical communications systems" by M. Martinelli et al., proceedings of 2006 China-Italy Bilateral Workshop on Photonics for Communications and Sensing (Xi'an, China, 23-24 Oct. 2006) discloses theoretical and experimental aspects of polarization stabilization. WO2006/045324 patent application, which is herein incorporated by reference, discloses methods and devices for stabilizing the state of polarization of a polarization multiplexed optical radiation, as well as related polarization division multiplexing optical communication systems.

SUMMARY OF THE INVENTION

The Applicant has realized that none of the known solutions for polarization stabilization is at the same time accurate enough to meet current application needs and fast enough to be suitable to compensate state of polarization (SOP) fluctuations having the speed observed in field, while at the same time being simple enough to be practically feasible.

In particular, the Applicant has realized that the two-stage stabilizers described in the cited WO03/014811 and WO06/027205, wherein the two stages are controlled independently by a similar algorithm, show a severe limitation in the maximum speed of the input SOP fluctuations that they can compensate for. In more details, the Applicant has recognized a response speed limitation of the two-stage stabilizer due to the fact that the switching of the first birefringent element of the first stage causes a SOP variation much faster than the input SOP fluctuations, whereby such SOP variation has to be compensated by the second stage. In fact, the switching of the first birefringent element of the first stage induces a SOP variation at the first stage output represented on the Poincaré sphere by a rotation of an odd multiple (preferably equal to 1) of 180° along a great circle. To compensate this SOP variation, the phase retardation of the second birefringent element of the second stage is varied and at least once it should overcome a limit of its finite range for obtaining an endless stabilization. In order to prevent this overcoming, the phase retardation of the first birefringent element of the second stage is switched. The variation of the first stage output SOP must be small during the switching of the first birefringent element of the second stage. Therefore this latter switching must be much faster than the switching of the first birefringent element of the first stage. For example, the first stage step cycle of the respective control digital algorithm needs to be greatly slowed down with respect to the second stage.

In an aspect, the present invention relates to a two-stage polarization stabilizer, each stage comprising two (typically finite-range) birefringent components with controllable phase retardation between fixed orthogonal eigenstates of polarization, wherein the first stage transforms any input SOP into a SOP represented by a point on a fixed great circle of the Poincaré sphere (see below), referred to as Γ, and successively the second stage transforms said SOP represented by a point on Γ into a defined (typically fixed) SOP, and wherein, in case the controllable phase retardation of the second birefringent component of each stage reaches a respective limit value, the controllable phase retardation of the first birefringent component of each stage is commuted between first and second values.

The Applicant believes that in the above polarization stabilizer if the controllable phase retardation of the first birefringent component of the first stage is kept constant while the first birefringent component of the second stage is changing its controllable phase retardation because of commutation it is possible to achieve a relevant increase of the maximum speed of the input SOP fluctuations that can be compensated.

It is further believed that the solution above avoids the need of a commutation of the first birefringent component of the second stage much faster than the commutation of the first birefringent component of the first stage.

Further advantages of the method and device for stabilizing the polarization of an optical radiation in accordance to the present invention are the high accuracy, the simplicity and the economical and technical feasibility.

The present invention in one or more of its aspects is set forth in the appended set of claims.

In an aspect, the present invention refers to a polarization stabilizing device for stabilizing the state of polarization of an optical radiation, comprising a first and a second birefringent element having fixed polarization eigenstates and operable to provide in sequence to the optical radiation respectively first and second controllable phase retardation; a detecting system apt to generate at least a first monitor signal representative of an optical power of a first polarized portion of the optical radiation output from the second birefringent element; a third and a fourth birefringent element having fixed polarization eigenstates and operable to provide respectively third and fourth controllable phase retardations in sequence to the optical radiation outputting from the second birefringent element; and a further detecting system apt to generate a second monitor signal representative of an optical power of a further polarized portion of the optical radiation output from the fourth birefringent element; and a controller connected for receiving said first monitor signal from the detecting system and for supplying first and second control signals, responsive to said first monitor signal, respectively to the first and second birefringent elements so as to control said first and second controllable phase retardations, and connected for receiving said second monitor signal from the further detecting system and for supplying third and fourth control signals, responsive to said second monitor signal, respectively to the third and fourth birefringent elements so as to control said third and fourth controllable phase retardations; the controller being configured: to set the second control signal so as to maintain the polarization state of the optical radiation output from the second birefringent element at a defined great circle Γ on a Poincare sphere; and, in case the second controllable phase retardation reaches a first limit value, to set the first control signal so as to commute the first controllable phase retardation between first and second values; and to set the fourth control signal so as to maintain the state of polarization of the optical radiation output from the fourth birefringent element at a defined state of polarization, and to set, in case the fourth controllable phase retardation reaches a second limit value, the third control signal so as to commute the third controllable phase retardation between third and fourth values; wherein the controller is further configured to set the first control signal so as to keep constant the first controllable phase retardation while the third controllable phase retardation is commuting between said third and fourth values.

In an aspect, the detecting system comprises an optical element arranged to receive the optical radiation from the second birefringent element so as to pass at least said first polarized portion. In this case, advantageously the optical element is a polarizing beam splitter.

In an aspect, the controller is configured to set the first and second control signals responsive to said first monitor signal so as to maintain the fraction of the input power in the first polarized portion at a target value.

In an aspect, the further detecting system comprises a further optical element arranged to receive the optical signal from the fourth birefringent element so as to pass said further polarized portion.

In an aspect, the controller is configured to set the third and fourth control signals responsive to the second monitor signal so as to maintain the fraction of the input power in the further polarized portion at a further target value.

In an aspect, the detecting system (MS1) is further apt to generate a third monitor signal ($V_1$) responsive of an optical power of a second polarized portion of the optical radiation and to supply the further monitor signal ($V_1$) to the controller.

In an embodiment, the first and second birefringent element are respectively a first and a second variable retarder having respective eigenaxes oriented at approximately ±45 degrees relative to each other.

In this embodiment, the controller is advantageously configured to set the second control signal so as to transform an input arbitrary time variable polarization state into an elliptical output polarization state, belonging to the above great circle on the Poincaré sphere, with axes parallel to the eigenaxes of the second variable retarder.

In the embodiment above, the controller is advantageously configured to set the first control signal to commute the first phase retardation when the state of polarization of the optical signal transmitted by the first variable retarder has axes parallel to the eigenaxes of the second variable retarder.

In an embodiment, particularly advantageous in the embodiment above, the third and fourth birefringent element are respectively a third variable retarder and a fourth variable retarder having respective eigenaxes oriented at approximately ±45 degrees relative to each other.

In an embodiment, the first and second birefringent element are respectively a first and a second variable polarization rotator; and the device further comprises a quarter-wave plate optically interposed between the first and the second variable polarization rotator and having eigenaxes oriented at respectively +45-δ degrees and −45-δ degrees to a defined azimuth, wherein δ is a fixed arbitrary value expressed in degrees and said defined state of polarization has said defined azimuth.

In this latter embodiment, the controller is advantageously configured to set the second control signal so as to maintain the polarization azimuth of the optical radiation output from the second variable polarization rotator at a value of about +45 degrees or −45 degrees to said defined azimuth.

In this latter embodiment, the above first limit value is advantageously equal to about k180+2δ degrees, wherein k is an integer and δ is the above arbitrary value expressed in degrees. Preferably, a range of variation of the second controllable phase retardation spans from k180+2δ degrees to (k+k')180+2δ degrees, wherein k' is an integer different from zero.

In an embodiment, particularly advantageous in the latter embodiment above, the third and fourth birefringent element are respectively a third and a fourth variable polarization rotator; and the device further comprises a further quarter-wave plate optically interposed between the third and the fourth variable polarization rotator and having eigenaxes oriented at respectively +45-δ' degrees and −45-δ' degrees to said defined azimuth, wherein δ' is a further arbitrary fixed value expressed in degrees.

In the latter embodiment, the third and fourth values are equal respectively to about n'180−2δ' degrees and (n'+n") 180−2δ' degrees, wherein n' is an integer, n" is an odd integer and δ' is said further arbitrary fixed value expressed in degrees.

In the two latter embodiments, the second limit value is advantageously equal to about n180+2δ' degrees, wherein n is an integer.

In an aspect, the above optical radiation is a polarization multiplexed optical radiation comprising an identified channel which is provided with a pilot signal, the above detecting system is responsive to the pilot signal, the first polarized portion belongs to said identified channel and the SOP of the identified channel output from the second birefringent element is at the above defined great circle Γ.

In this latter aspect, the further detecting system is advantageously responsive to the pilot signal, the further polarized portion belonging to the identified channel and the state of polarization of the identified channel output the fourth birefringent element being at the above defined state of polarization.

In the above latter aspect, the detecting system is advantageously further apt to measure the optical power of a second polarized portion of the identified channel output from the second birefringent element, wherein said second polarized portion is orthogonal to the first polarized portion.

In the above latter aspect, the detecting system is advantageously configured to measure a modulation amplitude of the pilot signal so as to measure the optical power of the first polarized portion.

In the above latter aspect, the detecting system advantageously comprises a splitter for extracting a power portion of the polarization multiplexed optical radiation, a polarization splitter for extracting a polarized portion of the power portion, a photodiode for generating a signal from the above polarized portion of the power portion and a demodulator for band-pass filtering said signal to obtain the above modulation amplitude of the pilot signal.

In an aspect, the present invention refers to an optical polarization demultiplexer comprising the polarization stabilizing device of the above latter aspect and a polarization division demultiplexer, preferably a polarization beam splitter, located, with respect to a direction of propagation of the optical radiation input into the device, downstream the polarization stabilizing device and oriented parallel or perpendicular to said defined state of polarization.

In an aspect, the present invention refers to a polarization division multiplexing system comprising: a polarization transmitter comprising a polarization multiplexer apt to combine a first and a second optical channel having orthogonal polarization; a transmission line apt to propagate said combined first and second optical channel; and the above optical polarization demultiplexer, optically coupled to said transmission line, and apt to separate said first and second optical channel, wherein the first channel comprises said pilot signal.

In an aspect, the present invention refers to a method of stabilizing the state of polarization of an optical radiation, the method comprising:

1) applying sequentially to the optical radiation a first and a second controllable phase retardation;

2) detecting an optical power of at least a first polarized portion of the optical radiation obtained after step 1;

3) applying sequentially to the optical radiation obtained after step 1 a third and a fourth controllable phase retardation;

4) detecting an optical power of a further polarized portion of the optical radiation obtained after step 3;

5) controlling, responsive to the optical power of said first polarized portion, the second controllable phase retardation so as to maintain the polarization state of the optical radiation obtained after step 1 at a defined great circle Γ on a Poincare sphere;

6) subject to step 8, in case the second controllable phase retardation reaches a first limit value, commuting the first controllable phase retardation between first and second values;

7) controlling, responsive to the optical power of said further polarized portion, the fourth controllable phase retardation so as to maintain the polarization state of the optical radiation obtained after step 3 at a defined state of polarization;

8) in case the fourth controllable phase retardation reaches a second limit value, commuting the third controllable phase retardation between third and fourth values, keeping constant the first controllable phase retardation while the third controllable phase retardation is commuting between said third and fourth values. For the purpose of the present invention, the expressions "polarization stabilizer" and "polarization stabilization" are referred to as, respectively, an optical device and a method which stabilize both the two polarization parameters (ellipticity and azimuth). Also, the terms 'switching' and 'commuting' are used as synonymous.

BRIEF DESCRIPTION OF THE DRAWINGS

The features and advantages of the present invention will be made clear by the following detailed description of embodiments thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
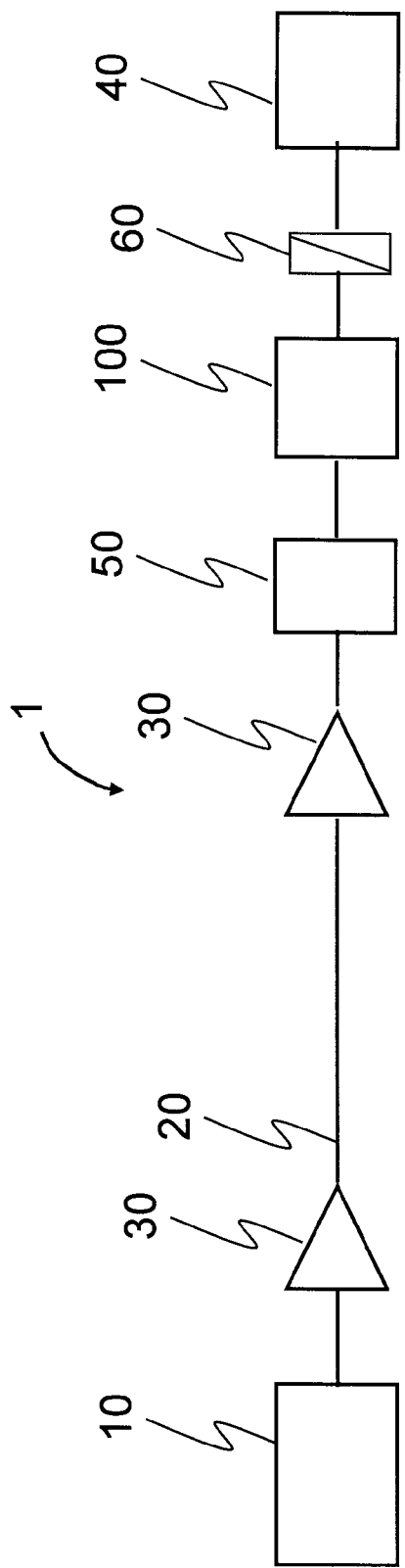
FIG. 1 schematically shows in terms of functional block an optical communication system in accordance to an aspect of the present invention.

FIG. 1 schematically shows an optical communication system 1, e.g. a polarization division multiplexing (PolDM) system, in accordance with one aspect of the present invention.

A transmitter 10 is apt to encode data information into an optical signal, for example a wavelength division multiplexing (WDM) optical signal and/or a PolDM optical signal. The transmitter 10 may include optical sources (e.g. lasers), modulators (e.g. electro-optic modulators), wavelength multiplexers, polarization multiplexers, optical boosters, etc.

In case of a WDM optical signal, it comprises a plurality of WDM carrier wavelengths each having a respective optical frequency equally spaced from the others by a given frequency spacing (e.g. 50 or 100 GHz). Preferably, said optical frequency lies in the near-infrared wavelength range, e.g. from 900 nm to 1700 nm, more preferably it lies in the range from about 1530 to about 1565 nm, also known as 'C-band'. In case of polarization division multiplexing, the optical signal comprises at least two optical channels orthogonally polarized, wherein one of the two channels, referred to as the identified channel, is typically provided with a pilot signal which may serve to uniquely identify said channel. Optionally, also the other channel may be provided with a second pilot signal uniquely identifying it.

The pilot signal may be a superimposed modulation such as for example an amplitude or intensity modulation, a phase modulation, an optical frequency modulation or a polarization modulation, or it may be an identifying clock, for example an identifying bit-clock. The superimposed modulation may follow any given waveform, such as for example an harmonic wave (usually called pilot tone in case of intensity modulation) or a square wave (usually called dither). The frequency of modulation of the superimposed modulation should be low enough with respect to the data modulation rate (bit-rate) in order not to degrade the transmission quality. The Applicant has found that a suitable upper limit may extend up to 5‰ of the bit-rate of a single channel (e.g. for a 10 Gbit/s single channel bit rate, the modulation frequency may span up to 50 MHz). On the other end, the frequency of modulation of the pilot signal should be high enough to differ from the continuous (zero frequency) spectral component. A possible range for the pilot signal frequency is from about 10 kHz to about 50 MHz.

The optical signal is launched into an optical transmission line 20 which may include an optical cable comprising optical fibres. Optical line amplifiers 30, such as for example EDFAs, may be distributed along the optical transmission line 20. A receiver 40 is placed at the end of the transmission line 20 or whenever the optical signal needs to be received, in order to convert the optical signal into an electrical signal. It may comprises optical pre-amplifiers, optical filters, photodetectors, electrical filters, etc.

A polarization stabilizer device 100 according to the present invention is placed upstream the receiver 40 in order to stabilize the SOP of the optical signal to a defined SOP before inputting the receiver section 40. In PolDM optical system, the SOP of one of the two optical channels inputting the polarization stabilizer 100 is converted to a defined SOP and consequently the SOP of the other of the two optical channels is uniquely stabilized to a SOP orthogonal to the defined SOP.

In case the WDM technique is used in the optical transmission system 1, a wavelength demultiplexer 50 is placed upstream the polarization stabilizer 100 in order to separate, at least partially, the different optical wavelengths. When WDM is used in combination with PolDM, each WDM carrier wavelength comprises two orthogonally polarized channels wherein at least one channel of each couple is identified by a pilot signal.

In PolDM, a polarization selective element 60, for example a polarization division demultiplexer such as a polarization beam splitter having its azimuth oriented parallel or perpendicular to the defined SOP, is placed at the output end of the polarization stabilizer device 100 in order to separate the two polarization multiplexed channels. The polarization selective element 60 may be integrated either within the polarization stabilizer device 100 or within the receiver 40. In case the two orthogonally polarized optical channels are closely spaced in the optical spectrum without overlapping ("polarization interleaved WDM"), it is preferable to superimpose a pilot signal to each WDM channel, For example, odd channels have a first pilot signal and even channels have a second different pilot signal. In this case, the wavelength demultiplexer 50 placed upstream the polarization stabilizer device 100 passes the desired WDM channel and one or more undesired adjacent optical channels. The desired WDM channel has a SOP orthogonal to the SOP of the adjacent channels. In polarization-interleaved WDM the polarization selective element 60 is advantageously a linear polarizer. The polarization stabilizer device 100 thus acts to align the SOP of the desired WDM channel to the polarizer by making use of the pilot signal of the desired channel. The residual portion of the adjacent WDM channels are thus filtered out by the polarizer.

Figure 2:
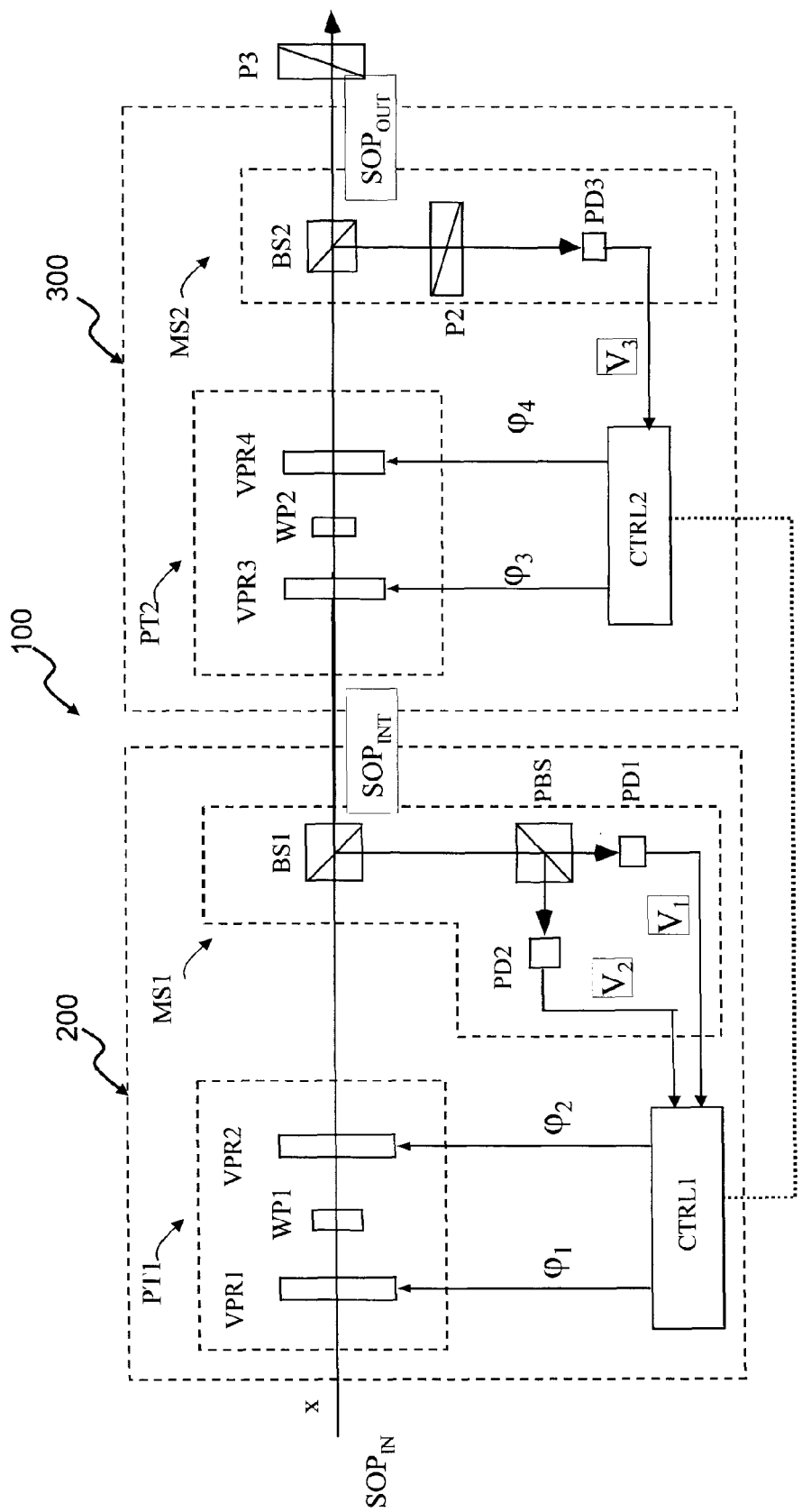
FIG. 2 schematically shows in terms of functional block an exemplary endless polarization stabilizer according to the present invention.

FIG. 2 shows an exemplary polarization stabilizer device 100 according to the present invention. The device 100 comprises a first and a second stage 200 and 300.

The device 100 has a principal optical path 'x' along which an optical radiation is received as an input optical radiation of arbitrary state of polarization (labeled $SOP_{IN}$ in the figure); the radiation then traverses the first stage 200 and outputs the first stage with a SOP labeled $SOP_{INT}$ in figure. The optical radiation then traverses the second stage 300 and is emitted from the device 100 as an optical radiation having a stabilized defined SOP (labeled $SOP_{OUT}$) and an optical power not depending on the input SOP.

The input optical radiation may be the optical signal described above. In particular, in case of WDM optical signal, the optical radiation is a single WDM carrier wavelength, obtained after the WDM demultiplexer 50 of FIG. 1. This single WDM carrier wavelength may be a single polarization channel or, when WDM is used in combination with PolDM, a pair of orthogonally polarized channels. In this latter case, any reference to the state of polarization is meant to refer to the SOP of one of the two channels, typically the one having the pilot tone.

The device 100 comprises a polarization transformer PT1 comprising first and second variable rotators VPR1 and VPR2 which are variable circularly birefringent elements having associated controllable phase retardations $\Phi_1$ and $\Phi_2$, respectively. The variable rotators VPR1 and VPR2 are cascaded along the beam path x. For the purpose of the present description and claims, the term 'rotator', or equivalently 'polarization rotator', refers to a birefringent element with circular eigenstates, i.e. a birefringent element that rotates the azimuth of the SOP while maintaining the ellipticity of the SOP constant. A circularly birefringent element giving a phase retardation $\Phi$ between the circular eigenstates causes a physical rotation of an angle $\Phi/2$ of the polarization azimuth.

The controllable phase retardation $\Phi_1$ may typically varies in a limited range, at least 180 degrees wide. Also the controllable phase retardation $\Phi_2$ may varies in a limited range at least 180 degrees wide.

In a preferred configuration, the variable rotators VPR1 and VPR2 are variable Faraday rotators, i.e. variable polarization rotators which make use of the magneto-optical Faraday effect and wherein the magnetic field applied to a magneto-optical material is varied.

The polarization transformer PT1 also comprises a quarter-wave plate WP1 placed along the beam path x and optically interposed between the first and second variable rotators VPR1 and VPR2. The orientation of the eigenaxes of the quarter-wave plate WP1 may be arbitrary. In other words, the eigenaxes of the quarter-wave plate WP1 are oriented respectively at +45-δ degrees and −45-δ degrees with respect to a defined azimuth, wherein δ is a fixed, arbitrarily chosen value expressed in degrees. It may be assumed that δ ranges from −90 degrees to +90 degrees, limits included. The expression 'defined azimuth' means a predetermined azimuth. The defined azimuth may be fixed or variable, in a predetermined way, with respect to the reference frame. Without loss of generality, the defined azimuth may be the vertical azimuth. The expression 'defined azimuth', as well as any reference to axis orientation in the present description and claims, implicitly assumes a reference frame which is solidly associated to the optical elements of the device 100. Typically those elements are fixed with respect to the laboratory.

The quarter-wave plate WP1, as well any other component in the present invention, may be replaced by a technical equivalent, such as a combination of birefringent elements performing the same function, without exiting from the scope of the present invention. In a preferred configuration, the polarization transformer PT1 consists, for what concerns the optical birefringent elements, only of the first and second variable rotators VPR1 and VPR2 and the quarter-wave plate WP1 optically interposed therebetween. Such a polarization transformer PT1 is advantageous due to its simplicity and consequently low insertion loss, high feasibility and high accuracy.

A polarization insensitive beam-splitter BS1 may be arranged in the beam path x to extract a small fraction of the optical radiation output from the second variable rotator VPR2. For minimum losses, the extracted portion of the radiation should be vanishingly small. However, in practice, the diverted portion needs to be large enough to provide a reasonable signal-to-noise ratio for subsequent processing associated with the control loop. A diverted power fraction of between 1-10% may be typical. For example, a beam splitter BS with a 90/10 splitting ratio may be used. It will be appreciated that other optical components can provide the same function of extracting a small fraction of the beam, for example an optical fiber coupler.

A polarizing beam splitter PBS may be optically connected to the beam splitter BS1 and is apt to receive the optical radiation extracted by the beam splitter BS1. The azimuth of the PBS is approximately parallel or perpendicular to the defined azimuth. In other words, the PBS is apt to separate a (linearly) polarized portion of the extracted optical beam having an azimuth parallel to the defined azimuth from a (linearly) polarized portion of the optical radiation having an azimuth orthogonal to the defined azimuth. Throughout the present description and claims, the term "polarized portion" or "polarized component" means the projected component of the optical beam along a given SOP. For sake of clarity, in case of deviation of the optical radiation, for example the reflection by the beam splitter BS1, the reference system for the state of polarization is accordingly transported. It will be appreciated that any other optical arrangement for performing the same function may be used instead of a polarizing beam splitter PBS. For example a polarization insensitive beam splitter followed by two orthogonally oriented linear polarizers, one for each output component of the polarization insensitive beam splitter is functionally the same as a polarizing beam splitter and they may be interchanged. Optical fiber components can also be used to provide the same function.

A first and a second photodiode PD1 and PD2 may be optically connected to the polarizing beam splitter PBS, one for each output of the PBS. They are apt to detect the two polarized components of the optical radiation output from the PBS and to generate respective signals $V_1$ and $V_2$ responsive of the optical power of the two polarized components of the optical radiation output from the PBS. It will be appreciated that these signals may be in electronic form, with the photodiodes being optoelectronic converters. However, it will also be appreciated that these processing elements could be embodied with all-optical components of the same functionality. This may be desirable for stabilizing extremely high frequency polarization instabilities where all-optical power sensing and control processing could be performed. In addition, the signals $V_1$ and $V_2$ may also be radio signals.

A controller (e.g. electronic) CTRL1 is connected to the first and second photodiode PD1 and PD2 and is apt to receive the signals $V_1$ and $V_2$. The controller CTRL1 has first and second outputs connected respectively to the first and second rotators VPR1 and VPR2. The controller CTRL is apt to generate output control signals, responsive to the signals $V_1$ and $V_2$, according to a control algorithm described further below. The output control signals are suitable to be sent to, and to control the phase retardations $\Phi_1$ and $\Phi_2$ of, the rotators VPR1 and VPR2, respectively. They are labeled $\phi_1$ and $\phi_2$ in FIG. 2.

In alternative configurations (not shown), for example when the power of the input optical beam is known and can be held constant, either photodiode PD1 or photodiode PD2 may be omitted. In this case, the polarizing beam splitter PBS may be replaced by a fixed linear polarizer oriented either parallel or perpendicular to the defined azimuth.

The function of the first stage 200 of the polarization stabilizer device 100 is to transform any (i.e. an arbitrary, time-variant) input SOP ($SOP_{IN}$) into an elliptical output SOP (SOP$_{INT}$) with principal axes at +45° and −45° to said defined azimuth, or, in equivalent words, an arbitrary input SOP into an elliptical output SOP (SOP$_{INT}$) with polarization azimuth oriented at about ±45 degrees (i.e. either +45° or −45°) with respect to said defined azimuth. Furthermore the first stage 200 sets the power of the optical radiation output from it to a value that is independent of the input SOP. When the defined azimuth is the vertical azimuth, the azimuth of SOP$_{INT}$ is either +45° or −45°. Conventionally, the value of the polarization azimuth is taken within the range from −90° to +90°.

As shown in FIG. 2, a second stage 300 is placed along the optical path x downstream the second variable rotator VPR2 of the first stage 200. The second stage 300 is apt to receive the optical radiation having one of the two polarization parameters stabilized and to transmit the optical radiation having both the polarization parameters stabilized (i.e. having a defined SOP labeled SOP$_{OUT}$). For example, without loss of generality, the defined SOP may be the vertical linear SOP, having vertical azimuth as defined azimuth and zero ellipticity as defined ellipticity. In addition the second stage 300 (and hence the whole device 100) sets the power of the optical radiation output from it to a value that is independent of the SOP input to it.

It is to be noted that the stabilizer 100 has no intrinsic loss. In other words, in perfect lossless operation, the polarization stabilized output optical radiation can potentially have up to the full power of the input optical radiation.

Referring to FIG. 2, the second stage 300 comprises a polarization transformer PT2 similar in structure to the polarization transformer PT1 described above. Accordingly it comprises third and fourth variable rotators VPR3 and VPR4, for example similar to the variable rotators VPR1 and VPR2, and an optically interposed quarter-wave plate WP2. The orientation of the eigenaxes of the quarter-wave plate WP2 may be arbitrary, similarly to the orientation of the quarter-wave plate WP1 of the first polarization transformer PT. In other words, the eigenaxes of the quarter-wave plate WP2 are oriented at ±45-δ' degrees with respect to the defined azimuth, wherein δ' is a further arbitrary value expressed in degrees. It may be assumed that δ' ranges from −90 degrees to +90 degrees, limits included.

The elements VPR3, WP2 and VPR4 are arranged along the main beam path x of the first stage 200 so as to sequentially receive the optical radiation (whose SOP is labeled SOP$_{INT}$ in FIG. 2) output from the polarization transformer PT1.

A polarization insensitive beam splitter BS2 (e.g. 90/10 or 99/1) is arranged along the main beam path x downstream the fourth rotator VPR4. A fixed linear polarizer P2 is placed at the reflected output of the beam splitter BS2 and it is oriented parallel or perpendicular to the defined azimuth. A further fixed linear polarizer P3 is advantageously placed along the beam path x and it is oriented parallel to the defined azimuth. The beam transmitted by the polarizer P3 is the linearly polarized output optical beam of the stabilizer 100. In case the polarization stabilizer 100 is used for PolDM demultiplexing, the further fixed linear polarizer P3 may be replaced by a polarizing beam splitter (corresponding to the polarization selective element 60 of FIG. 1) arranged along the main beam path x and oriented with its azimuth extending parallel or perpendicular to the defined output azimuth, so as to separate the orthogonally polarization multiplexed channels.

The beam splitter BS2 and the linear polarizer P2 are apt to extract a polarized portion of the optical beam and to direct it to a photodiode PD3, which is apt to measure the power of this extracted polarized portion and generate a signal V$_3$ responsive of the power.

A controller CTRL2 is connected to the photodiode PD3 and has first and second outputs connected to the third and fourth rotators VPR3 and VPR4 respectively.

The signal V$_3$ is sent to an input of the electronic controller CTRL2 that generates as outputs, responsive to the input signal V$_3$, control signals φ$_3$ and φ$_4$ for setting the rotators VPR3 and VPR4 to the appropriate phase retardation values Φ$_3$ and Φ$_4$.

Even though for the sake of clarity two separate controllers CTRL1 and CTRL2 are shown for the first stage 200 and the second stage 300, it will be understood that the two controllers could be and preferably are embodied in a single hardware, firmware or software unit. In any case, in accordance to the present invention, the controllers CTRL1 and CTRL2 are at least operatively connected, as symbolized by the dotted line in FIGS. 2 and 7, in order to communicate for allowing implementation of the algorithm of the present invention.

In operation, the input optical radiation having arbitrary input SOP traverses sequentially the first variable rotator VPR1, the quarter-wave plate WP1 and the second variable rotator VPR2. The first variable rotator VPR1 and the second variable rotator VPR2 rotate the azimuth of the optical radiation by respectively a first and a second variable angle Φ$_1$/2 and Φ$_2$/2, such that, in combination with the fixed action of the quarter-wave plate WP1, the SOP of the optical radiation output from the second variable rotator VPR2 (SOP$_{INT}$) has a polarization azimuth at about ±45 degrees (i.e. +45° or −45°) with respect to the defined azimuth.

A feedback control loop is designed to lock the polarization azimuth of the SOP (SOP$_{INT}$) of the optical radiation output from the second rotator VPR2 to the target azimuth value equal to ±45 degrees with respect to the defined azimuth. In this case, the optical power component transmitted by the PBS in FIG. 2 is equal to the optical power component reflected by the PBS.

The polarization insensitive beam splitter BS1 diverts a portion of the beam out of the main beam path x. The diverted portion of the beam is then received by the polarizing beam splitter PBS which splits the diverted beam portion into its two orthogonal polarization components, which are supplied to, and detected by, the respective photodiodes PD1 and PD2. The polarizing beam splitter PBS is oriented so that ideally the incident beam is totally reflected or transmitted in correspondence of an azimuth parallel or perpendicular to the defined output azimuth. The photodiodes PD1 and PD2 supply respective signals V$_1$ and V$_2$ as input signals to the controller CTRL.

The controller CTRL1 executes an algorithm described in more details below and generates the two signals φ$_1$ and φ$_2$, responsive of signals V$_1$ and V$_2$, controlling the phase retardations Φ$_1$ and Φ$_2$ respectively of VPR1 and VPR2. In particular, the algorithm contains a calculation of a first error value ε' which is related to the displacement of the polarization azimuth of the optical radiation output from the second variable rotator VPR2 from the target azimuth value equal to about ±45 degrees with respect to the defined azimuth. The aim of the control loop is to minimize the above error.

For example, the error may be defined as ε'=|V$_2$−αV$_1$−V$_{1REF}$|, where the parameter α is fixed so that the error is ideally zero when the polarized components of SOP$_{INT}$ parallel and perpendicular to the defined azimuth have equal optical power. V$_{1REF}$ is a predetermined reference value depending upon the used device components. The condition of zero error corresponds to an elliptical SOP$_{INT}$ with principal axes at ±45 degrees (i.e. +45° and −45°) to said defined azimuth. For example, considering the case of the first stage device 200 of FIG. 2 having an ideal PBS and photodiodes PD1 and PD2 having equal responsivities, the value of α may be chosen equal to 1. In general, different devices may have different values for the parameter α and $V_{1REF}$.

In those configurations, described above, wherein either photodiode PD1 or photodiode PD2 may be omitted, there is acquired at each control step of the feedback loop only one signal $V_{out}$ responsive of the optical power of a polarized component of the stabilized optical radiation and the error may be defined as $\epsilon'=|V_{out}-V_{ref}|$, where $V_{ref}$ is predetermined taking into account the input optical power and the behavior of the optical elements, e.g. their insertion losses, as well of the optoelectronic elements.

The minimization of the error is achieved by controlling the phase retardations $\Phi_1$ and $\Phi_2$ of the two variable rotators VPR1 and VPR2. The phase retardation $\Phi_2$ is varied in a continuous or quasi-continuous manner, with a discretization that follows from the stepwise incremental nature of the computer-implemented control scheme. It is convenient that the steps of variation of the phase retardation $\Phi_2$ have a constant absolute value $\Theta'_{STEP}$, referred to as the "step angle $\Theta'_{STEP}$", although non-constant step angles, for example dependent on the error magnitude or on the absolute value of the phase retardation $\Phi_2$, could be used. In general, the smaller the step angle size, the better the stabilization (smaller uniformity error), but a trade-off with the stabilization speed need to be considered. In fact, for a given step angle size $\Theta_{40STEP}$, the maximum SOP fluctuation on the Poincaré sphere in the step time of the control loop that can be compensated for is about $\Theta'_{STEP}/2$.

The phase retardation $\Phi_2$ of VPR2 is stepwise varied by the controller CTRL1, through respective control signal $\phi_2$, in a predefined range (also called 'variation range') of at least 180°, within the limited range. Preferably, this predefined range has lower limit and upper limit spaced apart by an integer (different from zero) multiple of 180°. More preferably, the predefined range spans from k180+2δ degrees to (k+k')180+2δ degrees (limits included), wherein k is an integer, k' is an integer different from zero, and δ is the fixed predetermined value expressed in degrees introduced above with reference to the orientation of the eigenaxes of the quarter-wave plate WP1. It is noted that with reference to the orientation of the eigenaxes of the quarter-wave plate WP1, the value of δ represents a physical angle in degrees, while with reference to the phase retardation $\Phi_2$, it represents a phase expressed in degrees. Preferably, k' is equal to 1 or −1. Exemplarily δ may be equal to zero. In this case the predefined range of variation of the phase retardation of VPR2 may be for example between 0° and 180° or between 180° and 360° or between 360° and 540°. Preferably, k is equal to 0.

Whenever the input SOP varies to cause the phase retardation $\Phi_2$ reach a limit of the predefined range, i.e. an upper or lower limit of the predefined range then the retardation $\Phi_1$ of the first variable rotator VPR1 is commuted by the controller CTRL1, through respective control signal $\phi_1$, between a first and a second value. However, in accordance to the present invention, the commutation of the first variable rotator VPR1 is prevented or, in case such commutation has already started, is halted throughout the whole commutation of the third variable rotator VPR3. Once this latter commutation has finished, the commutation of the first variable rotator VPR1 is started or, in case it has been halted, resumed.

Said first and second values may be chosen from a plurality of values, selectable for the above switch operation, within the limited range of the first rotator VPR1. Typically, the phase retardation $\Phi_1$ spans all the intermediate values during the commutation between a first and a second value. Preferably, two adjacent values within the plurality of switching values are spaced apart by an odd (different from zero) integer multiple of 180°. Preferably, the phase retardation $\Phi_1$ may be controlled to commute between only two retardation values which differ by an odd (different from zero) integer multiple of 180°. Preferably, this integer multiple is equal to 1 or −1. Preferably, the two retardations value are integer multiples of 180°, i.e. they assume the values of m180 and (m+m')180 degrees, wherein m is an integer and m' is an odd integer different from zero. Preferably m' is equal to 1 or −1. For example, m may be equal to 0, ±1 or ±2. Preferably, the two retardations value are equal to 0° and 180°. Exemplarily the first and second values of the first phase retardation may be chosen equal respectively to the upper and lower limit of the range of variation of the second phase retardation.

At the same time of the start of the switch of the first variable rotator VPR1, the sign of the phase retardation increments on the second variable retarder is reversed. In addition, the phase retardation of the second variable rotator VPR2 is kept constant throughout the commutation of the first rotator VPR1, possibly neglecting the first step of the commutation itself, wherein the phase retardation of the second variable rotator VPR2 may be adjusted by a step angle (see more details below). For the sake of clarity, in the present description and claims the expressions "commutation of the first birefringent element of the first stage" or "the first birefringent element of the first stage is commuting" refer both to when the phase retardation of the first element is currently changing because of commutation, and when the phase retardation has been halted during commutation because of the ongoing commutation of the first birefringent element of the second stage. In the normal mode of operation, when the retardation of VPR2 is not at a limit, then the retardation of VPR1 is kept constant at, e.g., 0 or 180 degrees.

The optical radiation output of the first stage 200, having elliptical SOP with fixed axes ($SOP_{INT}$), traverses sequentially the third variable rotator VPR3, the quarter-wave plate WP2 and the fourth variable rotator VPR2. The third variable rotator VPR3 and the fourth variable rotator VPR4 rotate the azimuth of the optical radiation by respectively a third and a fourth variable angle $\Phi_3/2$ and $\Phi_4/2$, such that, in combination with the fixed action of the quarter-wave plate WP2, the SOP of the optical radiation output from the fourth variable rotator ($SOP_{OUT}$) is a fixed linear SOP having the defined azimuth with optical power independent of the input SOP.

A feedback control loop is designed to lock the output SOP ($SOP_{OUT}$) of the optical radiation output from the fourth rotator VPR4 to the target SOP having the defined azimuth and the defined ellipticity.

The polarization insensitive beam splitter BS2 diverts a portion of the beam out of the main beam path x. The diverted portion of the beam is then received by the polarizer P2 which passes a polarization component either parallel or orthogonal to the defined SOP to the photodiode PD3, where it is detected. The photodiode PD3 supplies the signal $V_3$ as input signal to the second controller CTRL2.

The second controller CTRL2 executes an algorithm described in more details below and generates the two signals $\phi_3$ and $\phi_4$, responsive of the signal $V_3$, controlling the phase retardations $\Phi_3$ and $\Phi_4$ respectively of VPR3 and VPR4. In particular, the algorithm contains a calculation of a second error value $\epsilon''$ which is related to the displacement of the SOP of the optical radiation output from the fourth variable rotator VPR4 from the target SOP. The aim of the control loop is to minimize the above error. For example, the second error may be defined as the absolute value of $V_3-V_{2REF}$, being $V_{2REF}$ a predetermined reference value of the kind of $V_{1REF}$. The aim of the feed-back is to minimize or maximize (depending on the azimuth orientation of the fixed polarizer P2) this error. This corresponds to an SOP output from the polarization transformer PT2 equal to the one passed by the polarizer P3, so that the optical power is totally transmitted by P3.

Whenever the SOP input to the fourth rotator VPR4 varies to cause the phase retardation $\Phi_4$ of the fourth rotator reaching a limit of its predefined range, the limit being equal to n180+2δ' degrees, n integer, then the retardation $\Phi_3$ of the third variable rotator VPR3 is commuted by the controller CTRL2, through respective control signal $\phi_3$, between respective first and second values. Said first and second values may be chosen from a plurality of values, selectable for the above switch, within the limited range of the third rotator VPR3. Typically, the phase retardation $\Phi_3$ spans all the intermediate values during the switch between a first and a second value. Preferably, two adjacent values within the plurality of switching values are spaced apart by an odd (different from zero) integer multiple of 180°. Preferably, the phase retardation $\Phi_3$ may be controlled to switch between only two retardation values which differ by an odd (different from zero) integer multiple of 180°. Preferably, this integer multiple is equal to 1 or −1. The controller CTRL2 is configured to ensure that the third variable rotator VPR3 preferably commutes between only two retardation values, e.g. 0−2δ' degrees and 180−2δ' degrees, while the fourth variable rotator VPR4 has a retardation step-wise smoothly varying, preferably in the range from 0+2δ' degrees to 180+2δ' degrees.

In accordance to the present invention, the two stages of the stabilizer are not independently controlled. The second controller CTRL2 communicates to the first controller CTRL1 the commutation status of the third rotator VPR3, i.e. whether the third rotator VPR3 is commuting or not. As long as the controller CTRL1 receives information that the commutation status of VPR3 is "on", i.e. the rotator VPR3 is currently commuting, it keeps constant the phase retardation of the first rotator VPR1. In case the controller CTRL1 receives information that the commutation status of VPR3 is "off", i.e. the rotator VPR3 is not currently commuting, then it operates the first stage 100 responsively only to the monitor signals $V_1$ and $V_2$ and, in case it is needed, allows the phase retardation of the first rotator VPR1 to be changed. FIGS. 3 and 4a-e are now referred to to explain the principles of operation of the polarization stabilizer 100 in terms of a Poincaré sphere representation.

For the sake of clarity, the following illustrative description refers to the particular case of the values δ and δ' both equal to zero.

Figure 3:
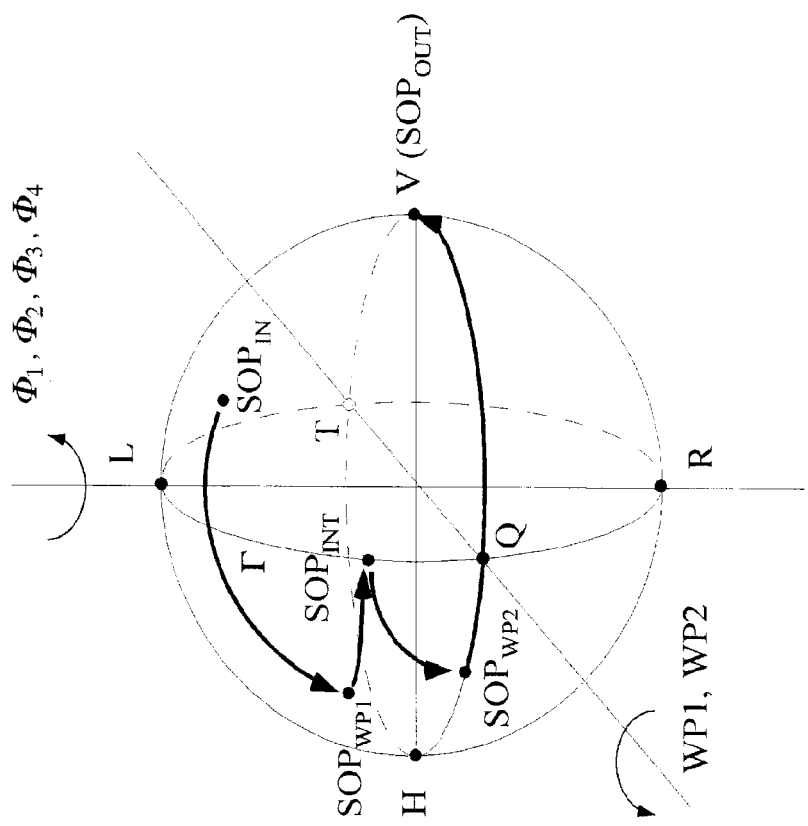
FIG. 3 shows a principle of operation of an exemplary polarization stabilizer of the present invention using a Poincaré sphere representation.

Referring to FIG. 3, each SOP is represented by a point on the sphere, with longitude 2η and latitude 2ξ.

The angle η is the azimuth of the major axis of the polarization ellipse and the quantity tan ξ is the ellipticity with sign plus or minus according to whether the SOP is left-handed or right-handed. The poles L and R correspond to the left (ξ=45°) and the right (ξ=−45°) circular SOP respectively. The points on the equator represent linearly polarized light with different azimuths η. In particular the points H and V correspond to the horizontal (η=0°) and the vertical (η=90°) linear SOP respectively. The points Q and T correspond to the linear SOP with azimuth η=45° and η=−45° respectively. The action of a fixed polarizer (such as P2) is to transmit only the component of light in a fixed SOP. The transmitted fraction of the incident optical power is $\cos^2(\phi/2)$, where φ is the angle at the center of the sphere between the representative points of incident and transmitted SOP.

For a generic birefringent element there are two orthogonal states of polarization, said eigenstates, which are not changed by the element itself. The effect of the propagation through a birefringent element is represented on the Poincaré sphere by a rotation of an angle Φ about a suitable axis. The diametrically opposite points corresponding to the orthogonal eigenstates belong to and identify this axis of rotation. The angle of rotation Φ is equal to the phase retardation or phase difference introduced by the birefringent elements between the eigenstates. In case of linearly birefringent element, that is an element with linearly polarized eigenstates, it is possible to define two orthogonal eigenaxes respectively as the fixed directions of the linearly polarized optical field corresponding to the eigenstates. A rotator is represented as a birefringent element having its axis of rotation on the vertical axis passing through the poles L and R, as shown in FIG. 3 with the top curved arrow near the symbols $\Phi_1$ and $\Phi_2$ representing the rotation on the sphere corresponding to the rotators VPR1 and VPR2, respectively.

For the sake of clarity, in FIG. 3 it is assumed that the first and the third commuted rotators VPR1, VPR3 do not act on the SOP ($\Phi_1$=0° and $\Phi_3$=0°).

In FIG. 3, an arbitrary input SOP ($SOP_{IN}$) is first transformed into $SOP_{WP1}$ by the quarter-wave plate WP1, having its axis of rotation passing through points T and Q and an associated fixed rotation on the sphere of 90°. Then it is transformed by the second rotator VPR2 into a SOP ($SOP_{INT}$) represented on the Poincaré sphere by a point belonging to the great circle Γ including the points L and Q, that is an elliptical SOP with major axis oriented at ±45° (i.e. with polarization azimuth equal to about +45° or −45°) with respect to the vertical defined azimuth. Thus, by suitably controlling the phase retardation $\Phi_2$ of the second rotator VPR2 in the exemplary range between 0° and 180°, any input SOP ($SOP_{IN}$) is transformed into a SOP belonging to the great circle Γ. In other words, the first stage 200 locks the polarization state on a meridian of the sphere, i.e. it locks the polarization azimuth value modulus 90° (the polarization azimuth to a defined value represented by a couple of values mutually orthogonal). It is contemplated that any great circle on the Poincaré sphere may take the place of the meridian Γ in FIG. 3, being the locus of the SOPs having one of the two polarization parameters (or a combination thereof) fixed.

The second stage 300 subsequently moves the SOP ($SOP_{INT}$) belonging to the great circle Γ into the output linear SOP with azimuth η=90°, corresponding to the point V (trajectory $SOP_{INT}$-$SOP_{WP2}$-$SOP_{OUT}$). The SOP belonging to the great circle Γ is first transformed into $SOP_{WP2}$ by the quarter-wave plate WP2, having its axis of rotation passing through points T and Q and an associated fixed rotation on the sphere of 90°. Then, by controlling the phase retardation $\Phi_4$, it is transformed by the fourth rotator VPR4 into the linear vertical SOP ($SOP_{OUT}$).

In the present polarization stabilizer design, to achieve an endless control, there is provided a pair of further variable rotators (VPR1 and VPR2) which are controlled to commute (i.e. switch) their respective phase retardation between, exemplarily, 0° and 180° when the phase retardation of the smoothly controlled rotator VPR2 or VPR4, respectively, reaches a range limit.

The endlessness of the control scheme of the first stage 200 will now be illustrated with reference to FIGS. 4a-e. To this purpose, it will be assumed that the representative point of the input SOP moves along the exemplary trajectory on the Poincaré sphere shown in FIG. 4a. Four successive representative positions of the input SOP (labeled with incremental numbers from 1 to 4) will be considered.

FIGS. 4b-4e represent the four corresponding SOP evolutions during the propagation of the optical radiation through the first stage 200. The points labeled with the subscripts VPR1, WP1 and VPR2 represent respectively the SOP outputted by the switched rotator VPR1, the SOP outputted by the linear plate WP1 and the SOP transmitted by the smoothly varied rotator VPR2.

Initially (FIG. 4b), the point 1 (SOP$_{IN}$) passes unperturbed the switched retarder VPR1 (phase retardation $\Phi_1$=0°). Then it is transformed into the point $1_{WP1}$ by the action of the quarter-wave plate WP1 and subsequently into the point $1_{VPR2}$ (belonging to Γ) by the action of the smoothly varied retarder VPR2 with exemplary phase retardation $\Phi_2$=90°.

Figure 4A:
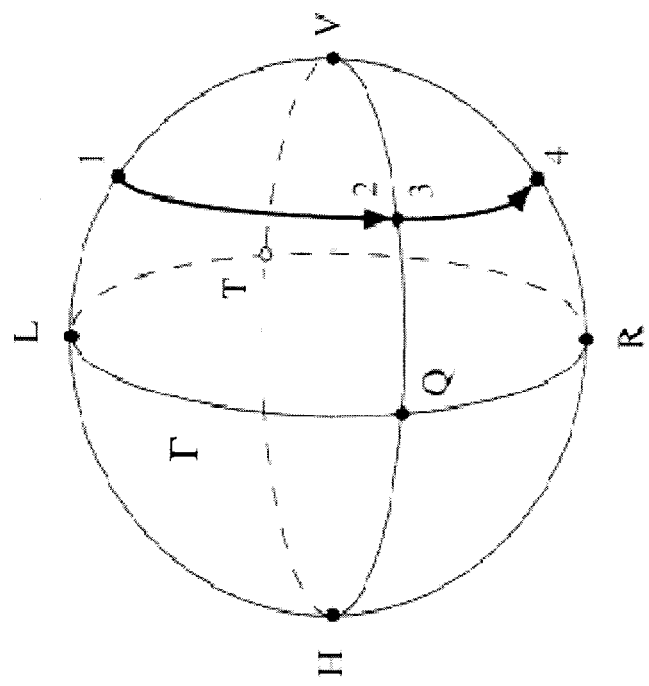
FIGS. 4a-4e pictorially illustrate the principle of endless operation of a first stage of an exemplary polarization stabilizer of the present invention using a Poincaré sphere representation.
Figure 4C:
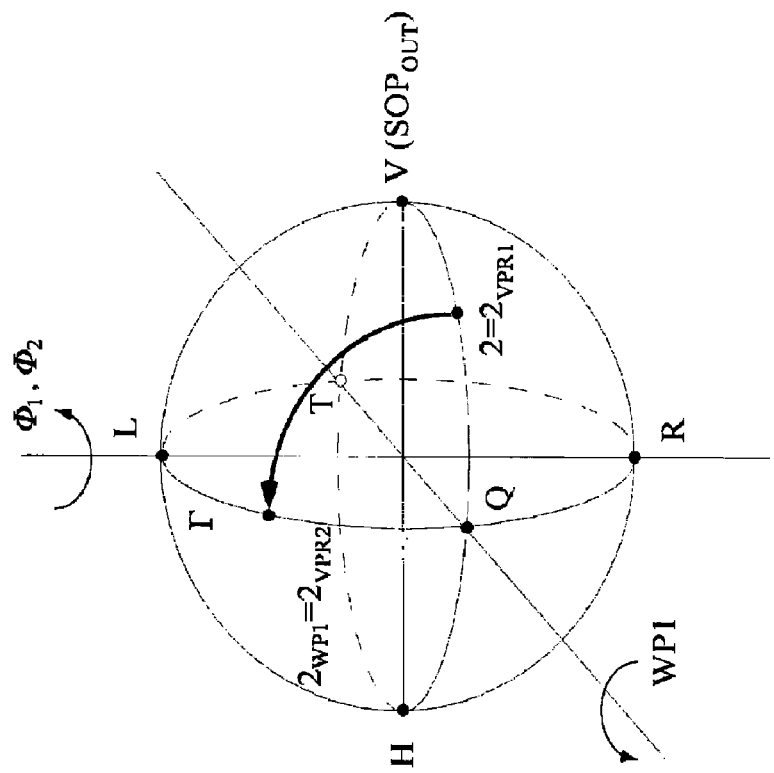
Figure 4B:
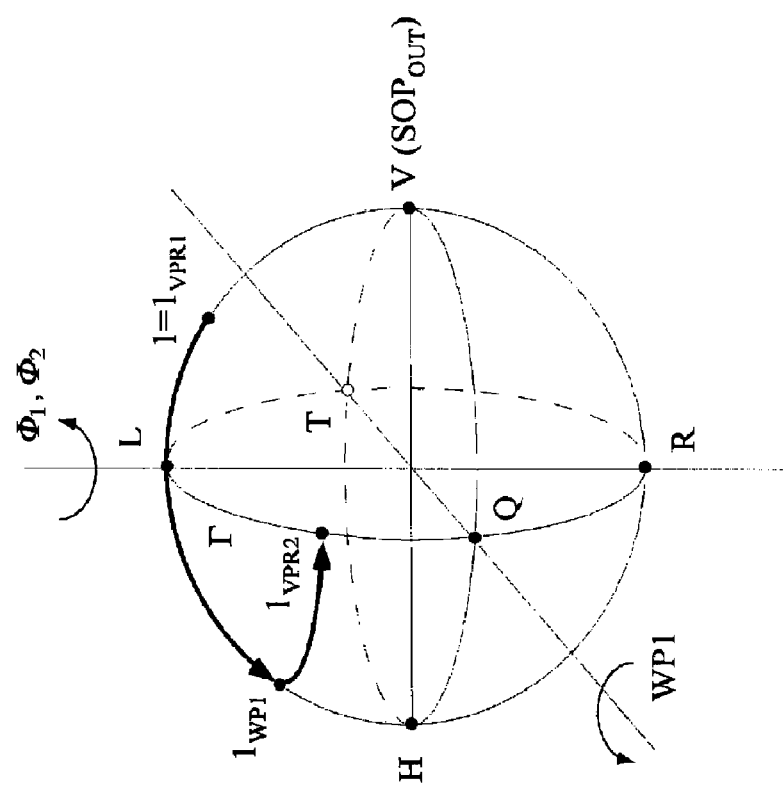

The variation of SOP$_{IN}$ shown in the trajectory from point 1 to point 2 in FIG. 4a, is compensated by progressively decreasing the phase retardation $\Phi_2$ till to zero when the point SOP$_{IN}$ intercepts the great circle including V and Q, i.e. the equator (point labeled 2 in FIG. 4c, $\Phi_1$=0°, $\Phi_2$=0°). In fact, after the action of WP1, the SOP is already on the great circle Γ.

Figure 4E:
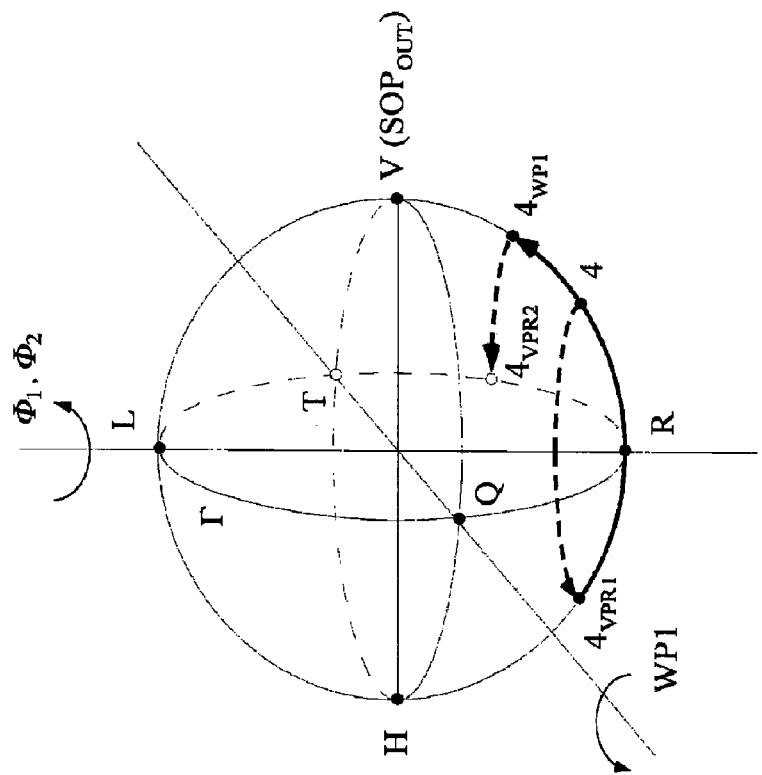
Figure 4D:
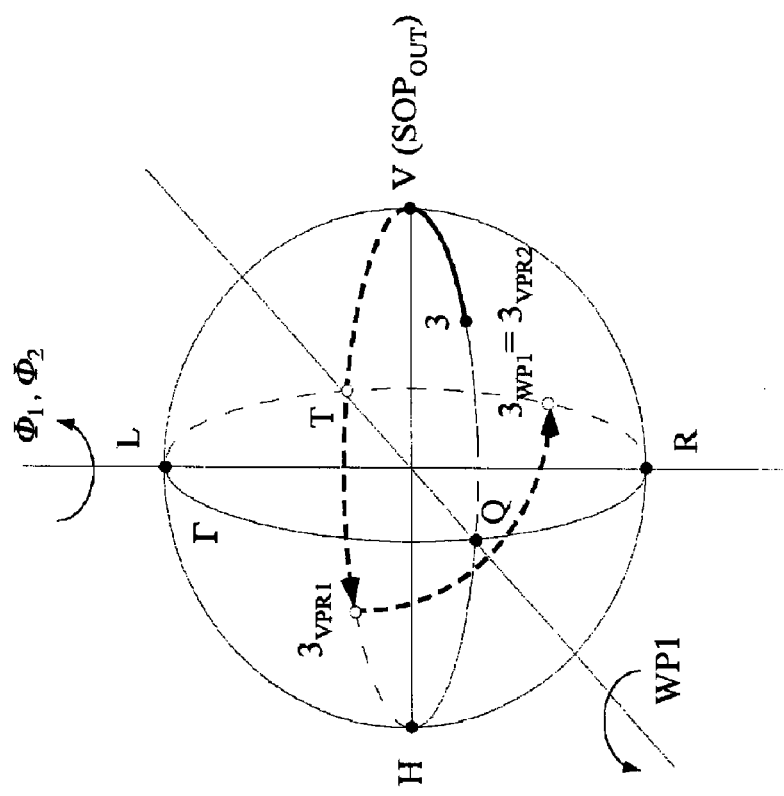

The further variation of SOP$_{IN}$ according to FIG. 4a can not be compensated simply by decreasing $\Phi_2$ because it has reached the lower limit. Therefore, in order to obtain an endless control, the phase retardation $\Phi_1$ is commuted to 180°, while $\Phi_2$ is kept constant (i.e. equal to zero). As illustrated in FIG. 4d, the polarization azimuth of the input SOP (point 3) is rotated of 90° by the first variable rotator VPR1 by means of a rotation of 180° around the vertical axis (i.e. $\Phi_1$=180°, $\Phi_2$=0°). Now the successive variation of SOPA is compensated by increasing $\Phi_2$ (FIG. 4e, $\Phi_1$=180°, $0_2$=90°).

It is important to note that during the commutation of the first phase retardation $\Phi_1$ A the SOP moves always on the equator (trajectory 3-$3_{VPR1}$ in FIG. 4d), which is subsequently transformed into the great circle Γ including L and Q by the quarter-wave plate WP1. During commutation, the subsequent rotator VPR2 is either at 0 or 180°, i.e. it transforms the circle Γ in itself. In conclusion, during the commutation of VPR1 the SOP transformed by the stabilizer 100 remains at the target polarization azimuth (module 90°), provided that the input SOP is nearly constant during the commutation.

The endless operation of the control procedure of the second stage 300 is now described with reference to FIGS. 5a-5c, under the assumption that the representative point of the incident SOP (SOP$_{INT}$) endlessly moves on the great circle Γ in the direction from point Q to point L.

Figure 5A:
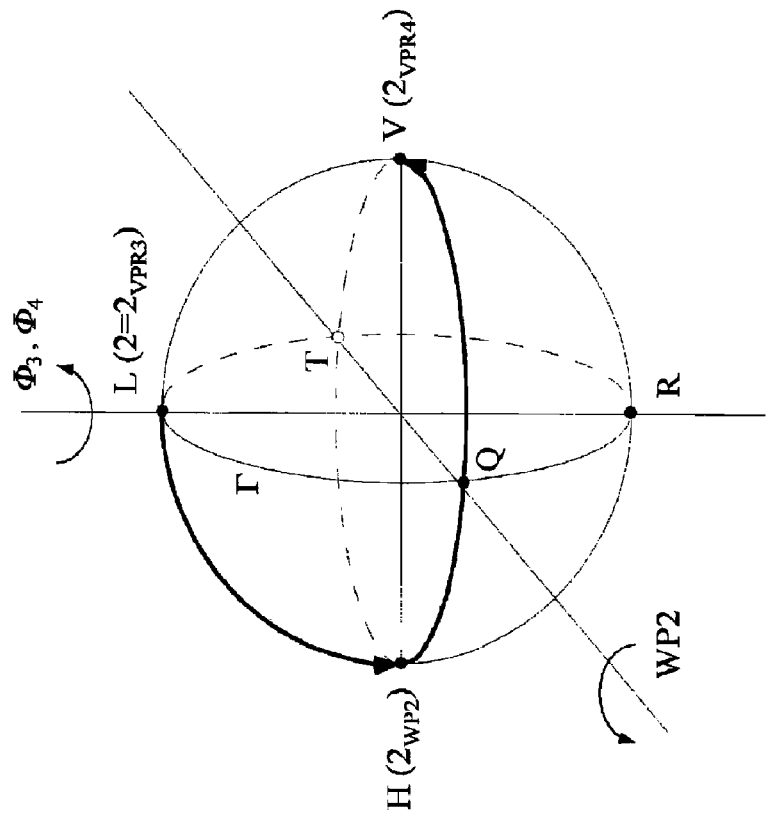
FIG. 5a-5c pictorially illustrate the principle of endless operation of a second stage of an exemplary polarization stabilizer of the present invention using a Poincaré sphere representation.
Figure 5B:
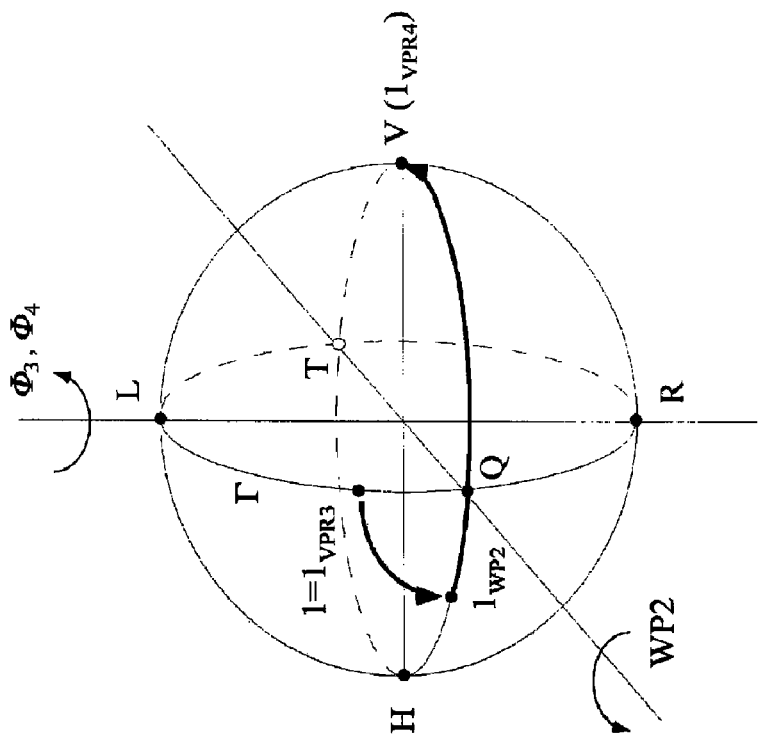
Figure 5C:
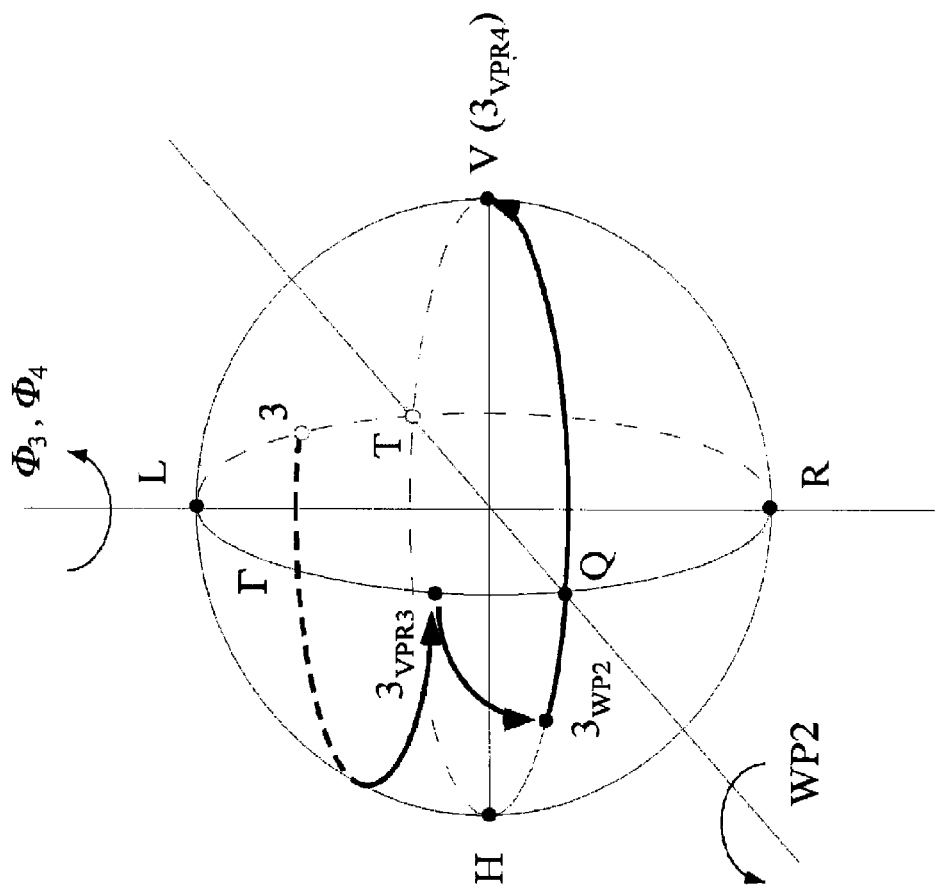

FIGS. 5a-5c represent the corresponding evolution of the SOPs during the propagation through the birefringent elements of the second stage 300. The points labeled with the subscripts VPR3, WP2 and VPR4 represent respectively the SOP output by the switched rotator VPR3, by the linear plate WP2 and by the smoothly varied rotator VPR4. In all cases the output SOP is the linear state represented by the point V.

Initially (FIG. 5a) the point 1, representative of the first SOP$_{INT}$, is left unaltered by the third rotator VPR3 ($\Phi_3$=0°). Then it is transformed into the point $1_{WP2}$ by the action of the quarter-wave plate WP2 and subsequently into the point $1_{VPR4}$ by the action of the smoothly varied rotator with exemplary phase retardation $\Phi_4$=3π/4. While the representative point 1 moves along the great circle Γ, the control algorithm reacts by increasing the phase retardation $\Phi_4$ until reaching the value of π when the point SOP$_{INT}$ reaches the north pole L, that is to say is left circularly polarized (FIG. 5b, point 2, $\Phi_3$=0, $\Phi_4$=π). The further variation of SOP$_{INT}$ cannot be compensated simply by further increasing $\Phi_4$ because it has reached the exemplary upper limit of π. Therefore, in order to obtain an endless control, the phase retardation $\Phi_3$ is commuted from 0 to π, while $\Phi_4$ is kept constant, i.e. equal to π (after commutation: $\Phi_3$=π, $\Phi_4$=π). As illustrated in FIG. 5b, since the point 2 (SOP$_{INT}$) is an eigenstate (L) of the variable rotator, it is not perturbed during the switching of the rotator VPR3. This assures that the commutation does not perturb the output power, provided that the SOP$_{INT}$ is nearly constant during the commutation. If this condition is fulfilled, then nearly all of the optical power incident on the polarizing element P3 is transmitted in any instant during the commutation through the polarizer P3, obtaining an endless polarization stabilization. Now the further variation of SOP$_{INT}$, as illustrated in FIG. 5c, can be compensated by decreasing $\Phi_4$ ($\Phi_3$=π, $\Phi_4$=3π/4).

Figure 6:
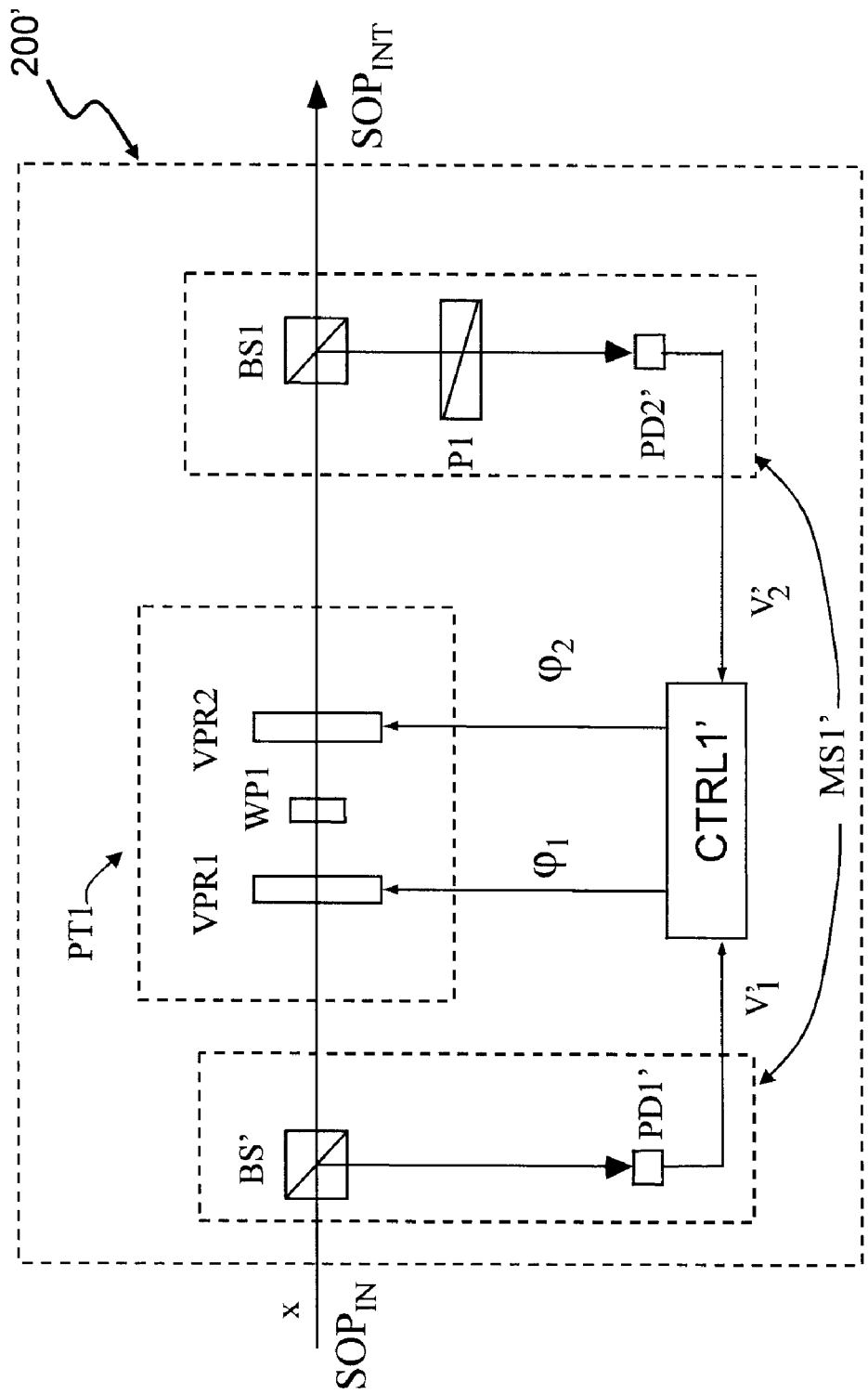
FIG. 6 schematically shows in terms of functional blocks an alternative embodiment of a first stage of a polarization stabilizer according to the present invention.

A possible alternative configuration for the first stage 200 of the device 100 of the present invention will be now described, with reference to FIG. 6. FIG. 6 shows a first stage 200' which essentially differs from the first stage 200 shown in FIG. 2 in the detecting system MS1'. The same reference numeral will be used for the same element, which will not be further described.

A polarization insensitive beam-splitter BS' (e.g. with a 90/10 split ratio) may be arranged in the optical path x and is apt to extract a small fraction (e.g. 10% in this example, or 1%) of the input optical radiation. The extracted fraction of the input optical radiation is directed to a photodiode PD1' which is apt to measure the power of the extracted fraction. The beam splitter BS' shown in FIG. 6 is located upstream the polarization transformer PT1 with respect to the direction of propagation of the optical radiation, but possible alternatives foresee to arrange the polarization insensitive beam splitter BS' along the optical path x either interposed between the polarization transformer PT1 and the beam splitter BS1 or downstream the beam splitter BS1. Alternatively, the beam splitter BS' can be also located between the beam splitter BS1 and the polarizer P1.

As shown in FIG. 6, a fixed linear polarizer P1 is apt to receive the optical radiation extracted by the beam splitter BS1. The azimuth of the linear polarizer P1 may be parallel or perpendicular to the defined azimuth. A photodiode PD2' is optically connected to P1 so that it is apt to measure the power of the polarized component transmitted by P1.

The principle of operation of the device 200' is similar to the one described for device 200. As in the case of the device 200, it is provided a detecting system (MS1') comprising elements (e.g. BS1, P1, PD2') having the function of extracting a polarized portion (e.g. orthogonal or parallel to the defined azimuth) of the optical radiation output from the second rotator VPR2 and generating a signal $V_2$' responsive to the optical power of said extracted polarized portion. The detecting system of the device 200' further comprises elements (e.g. BS', PD1') having the function of extracting a portion of the optical radiation along the beam path x and generating a signal $V_1$' responsive to the optical power of said extracted portion and indicative of the optical power propagating along the beam path x.

A controller CTRL1' generates an error value by comparing the optical power of the extracted polarized portion ($V_2$') with a value which is the expected value for this polarized component when the optical radiation output from the second rotator VPR2 has a polarization azimuth at ±45° with respect to the defined azimuth (i.e. lays on the great circle Γ). Such expected value is calculated based on the signal $V_1$'. For example, the error value may be defined as $\epsilon=|V'_1-\alpha V'_2|$, wherein a has the same function as in the case of device 200, that is to say serves for the comparison of the extracted polarized portion ($V_2$') with an expected value derived from $V'_1$. This error serves, through a cyclic feedback algorithm similar to the one presently described, to control the proper phase retardations $\Phi_1$ and $\Phi_2$ at each control step.

A second embodiment of the polarization stabilizer of the present invention will now be described with reference to FIG. 7. The same reference numerals will be used for identical elements, which will not be further described.

Figure 7:
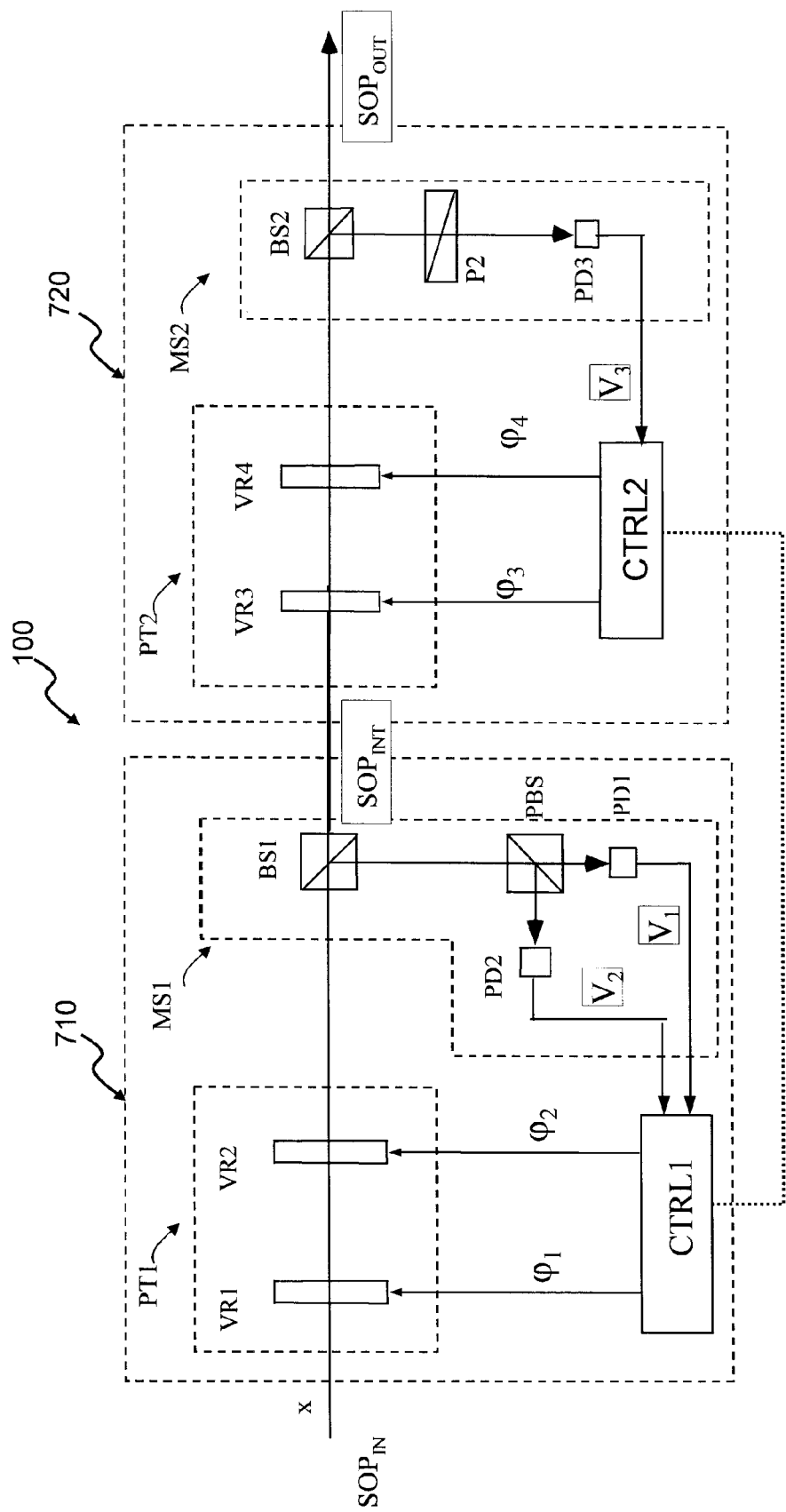
FIG. 7 schematically shows in terms of functional blocks an alternative embodiment of a polarization stabilizer according to the present invention.

The device 100 of FIG. 7 is apt to receive a optical radiation as an input optical radiation having an arbitrary state of polarization (SOP$_{IN}$). The optical radiation is emitted from the device 100 as an optical radiation having a stabilized defined SOP (SOP$_{OUT}$). Without loss of generality, the defined SOP is assumed to be the linear vertical SOP having the defined azimuth vertical and the defined ellipticity zero. The device 100 comprises a first 710 and a second 720 stage. The optical radiation traverses the first stage 710 and is outputs with a SOP (SOP$_{INT}$) having the polarization azimuth parallel or perpendicular with respect to the defined output azimuth (i.e. either 0° or 90° having assumed a vertical output azimuth). The optical radiation then traverses the second stage 720.

The first polarization transformer PT1 of the first stage 710 comprises a first and a second variable retarder VR1 and VR2. The second polarization transformer PT2 of the second stage 720 comprises a third and a fourth variable retarder VR3 and VR4. A variable retarder is a birefringent element having fixed birefringence eigenaxes and variable controllable phase retardation. The eigenaxes of the first variable retarder VR1 are oriented at approximately ±45° with respect to the eigenaxes of the second variable retarder VR2. The same is valid for the third and the fourth variable retarders VR3 and VR4. The eigenaxes of the third variable retarder VR3 are oriented approximately parallel (or perpendicular) with respect to the eigenaxes of the second variable retarder VR2, and the eigenaxes of both the variable retarders VR2 and VR3 are parallel (or perpendicular) with respect to the defined output SOP (vertical linear).

The monitoring systems MS1 and MS2 and the controller CTRL1, CTRL2 of the optical device 100 of FIG. 7 are in all similar to the corresponding elements described above with reference to FIG. 2. It is to be understood that, in alternative to the monitoring system MS1 shown in FIG. 7, it is contemplated to use in the first stage 710 the monitoring system MS1' described with reference to FIG. 6. Further details on the optical device 100 of FIG. 7 may be find in patent application WO03/014811 cited above. The control algorithm of the optical device 100 of FIG. 7 is similar to those described with reference to the optical device 100 of FIG. 2.

In the following, the general control procedure of a two-stage polarization stabilizing device will be summarized. For the sake of clarity, in the following exemplary description reference will be done to the embodiment shown in FIG. 2, even thought it is understood that the same description equally applies to any stabilizing device in accordance to the present invention, such as for example the one shown in FIG. 7.

The control procedure is preferably implemented as stepped digital algorithm(s) on DSP (Digital Signal Processing) hardware(s).

In one embodiment, two digital algorithms are run in parallel for controlling respectively the first and the second stages, wherein the algorithm controlling the first stage acquires, at least at each step, the current commutation status of the third birefringent element VPR3, which is output by the algorithm controlling the second stage at each respective step. In the present description and claims, the terms "step" and "stepped" refer to a whole control cycle of the digital algorithm, wherein the values of the control signals $\phi_1$, $\phi_2$ or $\phi_3$, $\phi_4$ are updated once. In this embodiment, the two digital algorithms may be run on two separate DSPs in mutual communication, as schematically depicted in FIGS. 2 and 7, or they can be run in parallel on a single hardware. In any case, the time step of the first and second algorithm may be different or equal. The fact that the first stage 200 is controlled in parallel to the second stage 300 may be advantageous, since the provision of two stages does not lead to any additional complexity to the control, since no time synchronization between the first and second respective controllers CTRL1 and CTRL2 is required.

In an alternative embodiment, a single digital algorithm controls both the stages 200 and 300, in the form of a single serial process having a single time step T$_{step}$ and being run on a single hardware machine. Typically, in this case all the operations regarding either one of the two stages are performed sequentially, and thereafter all the operations regarding the other of the two stages are performed sequentially.

Referring now to this latter case of a single serial process having a single time step, in normal operation (i.e. when neither one of the first and third element VPR1 and VPR3 are commuting), at each control cycle or step the signal controls $\phi_2$ of VPR2 and $\phi_4$ of VPR4 are changed so that the respective phase retardations $\Phi_2$ and $\Phi_4$ change by a respective quantity of respective constant step angle $\Theta'_{STEP}$ and $\Theta''_{STEP}$. In this case, the control algorithm keep constant both the signal controls $\Phi_1$ and $\Phi_3$ of the phase retardations of VPR1 and VPR3.

There is a trade-off between control speed and precision in locking condition. Actually the decrease of $\Theta'_{STEP}$, $\Theta''_{STEP}$ increases the precision, but decreases the control speed. For quantifying the precision of the control algorithm it may be considered the uniformity error $U=(I_{max}-I_{min})/(I_{max}+I_{min})$, where $I_{max}$ and $I_{min}$ are respectively the maximum and the minimum optical intensity at the stabilizer output in response of an input optical beam with constant intensity and variable SOP. The optimal value for step angles $\Theta'_{STEP}$ and $\Theta''_{STEP}$ depends upon the specific algorithm used and the specific application (e.g. upon the speed of SOP variations or upon the precision needed by the optical communication system). By means of numerical simulations, the Applicant has found that it is advantageous to choose both $\Theta'_{STEP}$ and $\Theta''_{STEP}$ less than or equal to about 10°, preferably less than or equal to about 5°. Also, the Applicant has found that it is advantageous to choose both $\Theta'_{STEP}$ and $\Theta''_{STEP}$ greater than or equal to about 0.5°, preferably greater than, or equal to, about 1°. The Applicant has determined that when $\Theta'_{STEP}$ and $\Theta''_{STEP}$ are both equal to 4°, then the uniformity error in correspondence to no SOP variations (or slow SOP variations) is less than 1%. For the sake of clarity, in the following $\Theta'_{STEP}$ and $\Theta''_{STEP}$ will be assumed equal and referred to as $\Theta_{STEP}$, even thought it is possible to choice different values.

At each step the control algorithm calculates the error of the first and second stage $\epsilon'$, $\epsilon''$: if the error at the current step becomes larger than the error at the previous step, then the respective sign of the respective phase retardation variation is changed, else the sign is not changed.

As concerns the second stage, if $\Phi_4$ has reached a range limit in the previous step and in the current step it should overcome this range limit, then in this current step the $\Phi_4$ variation is not executed (or in a preferred embodiment it is changed with a retardation variation opposite to that leading to the overcoming of the range limit), while the switching of $\Phi_3$ is started, and the sign of $\Phi_4$ variation for the following step is changed. Moreover, throughout the whole switching period, the value of $\Phi_4$ is maintained constant. The switching of VPR3 allows the output SOP of the second stage to be endlessly locked to a fixed SOP, without VPR4 overcoming its finite range of operation. The switching of VPR3 is such as to happen when the SOP at the input of VPR3 is identical to an eigenstate of VPR3 itself. Such a switching must be sufficiently fast, so that throughout the whole switching the SOP at the input of VPR3 remains nearly constant and is not varied by VPR4, otherwise the SOP after VPR4 moves and there is a significant error in the polarization stabilization in correspondence to the switching. The switching of $\Phi_3$ is performed varying the phase retardation $\Phi_3$ by $\Theta_{step}/2$ at each step during the switching, for a number of steps $M'=2*180°/\Theta_{step}$, hence it results that the switching time of VPR3 is $T_{switch}''=M'·T_{step}$. The VPR3 switching speed is $\omega_3=\Theta_{step}/(2T_{step})$ and the VPR4 speed is $\omega_4=\Theta_{step}/T_{step}=2·\omega_3$.

As concerns the first stage, if $\Phi_2$ has reached a range limit in the previous step and in the current step it should overcome this range limit, then in this current step the $\Phi_2$ variation is not executed (or alternatively it is changed with a retardation variation opposite to that leading to the overcoming of the range limit), while the switching of $\Phi_1$ is started, and the sign of $\Phi_2$ variation for the following step is changed. However, the variation of $\Phi_1$ is halted in correspondence of the switching of $\Phi_3$, and thereafter it is resumed after the switching of $\Phi_3$ is ended. The switching of VPR1 allows the output SOP of the first stage to be endlessly locked to $\Gamma$, without VPR2 overcoming its finite range of operation. Actually the switching of VPR1 is such as to generate a rotation of the point on $\Gamma$, representing the SOP after VPR2, until to the opposite point and this leads VPR3 to switch once. The switching of VPR1 is preferably sufficiently fast so that during the switching the input SOP is nearly constant, otherwise the SOP after VPR2 moves away from $\Gamma$ and there is a significant error in correspondence to the switching.

The switching of $\Phi_1$ is performed varying the phase retardation $\Phi_1$ by $\theta_{step}/2$ at each of the M steps in which $\Phi_3$ is not varied, being $M=2*180°/\Theta_{step}$, and keeping the phase retardation $\Phi_1$ constant in the M' steps of commutation of VPR3. Hence it results that the switching time of VPR1 is $T'_{switch}=(M+M')·T_{step}$. The VPR1 switching speed is $\omega_1=\Theta_{step}/(2T_{step})$ and the VPR2 speed is $\omega_2=\Theta_{step}/T_{step}=2·\omega_1$. Besides, during all the M+M' steps of the VPR1 switching the value of $\Phi_2$ is maintained constant (i.e. it is not varied).

In conclusion, in the preferred embodiment considered, it results $\omega_2=\omega_4=2·\omega_1=2·\omega_3$. So all the retarders have a speed of comparable magnitude. From numerical simulations, the Applicant has found that the precision in SOP stabilization is not appreciably degraded while the input SOP variation in a switching time $T_{switch}'$ is not greater of $\Theta_{step}$. So we can define the maximum input SOP fluctuation speed that can be effectively compensated by the stabilizer as $\omega_{max}=\Theta_{step}/T_{switch}'=\Theta_{step}/((M+M')·T_{step})$. Furthermore it results $\omega_3=(M+M')·\omega_{max}$.

In case $\Theta_{STEP}$ is equal to 4°, then $\omega_3=180·\omega_{max}$. It is noted that the choice of the VPR4 speed as $\omega_4=2·\omega_1$ allows compensating the first stage output SOP variation, with maximum speed $\omega_1$, induced by the VPR1 variation during switching.

Figure 8:
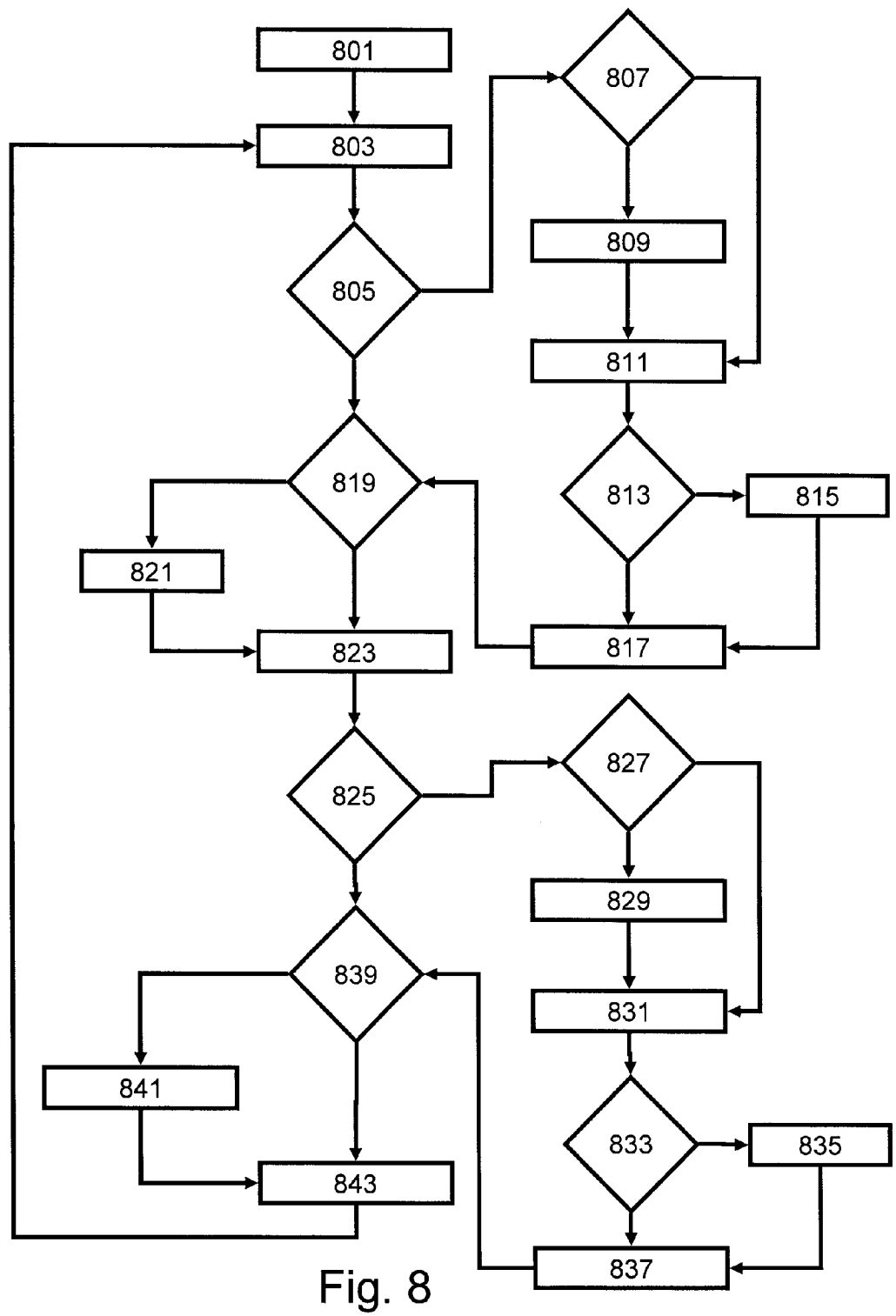
FIG. 8 is a block diagram of an exemplary embodiment of the control algorithm in accordance to the present invention.

In the following an exemplary digital algorithm, in the form of a single serial process having a single time step, is described in greater details with reference to FIG. 8.

The control algorithm comprises the following algorithm statements:

Statement 801: assignment of the constants $\alpha$, $V_{1REF}$, $\Theta'_{STEP}$ (representing the step angle in degrees of the phase retardation $\Phi_2$ of the second retarder of the first stage), M and M' (representing the number of steps of variation of the phase retardation during commutation of respectively the first and the third rotator), $V_{2REF}$, $\Theta''_{STEP}$ (representing the step angle in degrees of the phase retardation $\Phi_4$ of the second retarder of the second stage); initialization to zero of the value of the error of the first stage at the previous step $\epsilon'_{PAST}$; initialization to zero of the value of the error of the first stage at the current step $\epsilon'$, initialization to zero of the variable RES1 (representing the commutation state of the first rotator VPR1 of the first stage) that can assume only the values 0 or +1 or −1; initialization to zero of the variable $\Phi_1$, corresponding to the phase retardation in degree of the first rotator, initialization of the variable $\Phi_2$ (corresponding to the phase retardation in degree of the second rotator) to the middle range value, e.g. 90°; initialization to +1 of the variation sign $\sigma'$ (which may assume the values +1 or −1) of the phase retardation $\Phi_2$;

initialization to zero of the value of the error of the second stage at the previous step $\epsilon''_{PAST}$; initialization to zero of the value of the error of the second stage at the current step $\epsilon''$, initialization to zero of the variable RES2 (representing the state of commutation of the first rotator VPR3 of the second stage) that can assume only the values 0 or +1 or −1; initialization to +1 of the variation sign $\sigma''$ (which may assume the values +1 or −1) of the phase retardation $\Phi_4$; initialization to zero of the variable $\Phi_3$, representing the phase retardation in degree of the first rotator of the second stage, initialization of the variable $\Phi_4$ (corresponding to the phase retardation in degree of the second rotator of the second stage) to the middle range value, e.g. 90;

Statement 803: acquisition of $V_1$ (i.e. the first monitoring signal of the first stage) from the first photodiode; acquisition of $V_2$ (i.e. the second monitoring signal of the first stage) from the second photodiode; acquisition of $V_3$ (i.e. the third monitoring signal of the second stage) from the third photodiode; calculation of the current error of the first stage $\epsilon'$ as absolute value of $(V_2-\alpha V_1-V_{1REF})$; calculation of the current error of the second stage $\epsilon''$ as absolute value of $(V_3-V_{2REF})$;

Statement 805: check whether RES1 is equal to zero, i.e. whether the first element of the first stage is not commuting (i.e. the phase retardation of the first element is not currently changing because of commutation, nor it has been halted during commutation because of the ongoing commutation of the first birefringent element of the second stage). In case RES1=0, i.e. the first element of the first stage is not commuting, then statements 807-817, else directly to statement 819:

Statement 807: check if the current error $\epsilon'$ is greater than the previous error $\epsilon'_{PAST}$;

Statement 809: in case the current error $\epsilon'$ is greater than the previous error $\epsilon'_{PAST}$, then inversion of the variation sign $\sigma$;

Statement 811: variation of $\Phi_2$ by a quantity of absolute value $\theta'_{STEP}$ and sign $\sigma'$;

Statement 813: check if $\Phi_2$ is greater than 180 or less than 0 (i.e. whether $\Phi_2$ is out of its range).

In case $\Phi_2$ is greater than 180 or less than 0, then (Statement 815):

Statement 815: assign RES1 to +1 (flag of the commutation state of the first element of the first stage set to commutation from 0 to 180) in case $\Phi_1$ is equal to zero, else ($\Phi_1=180$) assign RES1 to −1 (flag of the commutation state of the first element of the first stage set to commutation from 180 to 0), inversion of the variation sign $\sigma'$ and variation of $\Phi_2$ by a quantity of absolute value $\Theta'_{STEP}$ (alternatively of absolute value equal to $2\Theta'_{STEP}$) and sign $\sigma'$;

Statement 817: assignment of the current error $\epsilon'_1$ to the previous error $\epsilon'_{PAST}$;

Statement 819: check whether RES2 is equal to zero, i.e. whether the first element of the second stage is not commuting: in case the first element of the second stage is not commuting, then statements 821-837, else directly to statement 839:

Statement 821: in case RES1 is equal to +1 or −1, then variation of $\Phi_1$ by a quantity of absolute value equal to 180 divided by M and sign given by RES1 and, in case $\Phi_1$ reaches either zero or 180 (end of commutation), assignment of RES1 to zero;

Statement 827: check if the current error $\epsilon''$ is greater than the previous error $\epsilon''_{PAST}$, Statement 829: in case the current error $\epsilon''$ is greater than the previous error $\epsilon''_{PAST}$, then inversion of the variation sign $\sigma''$;

Statement 831: variation of $\Phi_4$ by a quantity of absolute value $\Theta''_{STEP}$ and sign $\sigma''$;

Statement 833: check if $\Phi_4$ is greater than 180 or less than 0 (i.e. whether $\Phi_4$ is out of its range).

In case $\Phi_4$ is greater than 180 or less than 0, then (statement 835):

Statement 835: assign RES2 to +1 (flag of the commutation state of the first element of the second stage set to commutation from 0 to 180) in case $\Phi_3$ is equal to zero, else ($\Phi_3$=180) assign RES2 to −1 (flag of the commutation state of the first element of the second stage set to commutation from 180 to 0), inversion of the variation sign $\sigma''$ and variation of $\Phi_4$ by a quantity of absolute value $\Theta''_{STEP}$ (preferably of absolute value equal to $2\Theta''_{STEP}$) and sign $\sigma''$;

Statement 837: assignment of the current error $\epsilon''$ to the previous error $\epsilon''_{PAST}$;

Statement 839: check whether RES2 is equal to +1 or −1, i.e. whether the first element of the second stage is commuting;

Statement 841: in case RES2 is equal to +1 or −1, then variation of $\Phi_3$ by a quantity of absolute value equal to 180 divided by M' and sign given by RES2 and, in case $\Phi_3$ reaches either zero or 180 (end of commutation), assignment of RES2 to zero;

Statement 843: output of the phase retardation values $\Phi_1$, $\Phi_2$, $\Phi_3$, $\Phi_4$, return to algorithm Statement 803.

The phase retardation values $\Phi_1$, $\Phi_2$, $\Phi_3$, $\Phi_4$, are then transformed in control signal values.

As a comparative example, a two-stage polarization stabilizer of the kind described in cited WO03/014811 and/or WO06/027205 will be considered. It will be assumed that the control of the two stages is performed independently, so that the phase retardation of the first birefringent element of the first stage (hereinafter VPR1) may be varied contemporarily with the commutation of the first birefringent element of the second stage (hereinafter VPR3). Let's assume that the step angle $\Theta_{step}'$ and $\Theta_{step}''$ of variation, in absolute value, of the phase retardation of both the second and the fourth birefringent elements at each step of the corresponding control algorithm is equal to 4°. Let's also assume that both the first and the third birefringent element are set to commute in a single step of the respective control algorithm, having duration $T_{step}'$ and $T_{step}''$, respectively. It results that the speed of the four birefringent elements is respectively $\omega_1$=180°/$T_{step}'$, $\omega_2$=4°/$T_{step}'$, $\omega_3$=180°/$T_{step}''$, $\omega_4$=4°/$T_{step}''$.

The commutation of VPR1 causes a 180°-rotation on $\Gamma$ of the SOP output from the first stage ($SOP_{INT}$) at a speed equal to $\omega_1$ and this SOP variation has to be compensated by the second stage.

During the 180°-rotation on $\Gamma$, at least one (typically only one) commutation of VPR3 is needed. During the whole of the latter commutation, the variation of the first stage output SOP must be small.

Said $\omega_{max}$ the maximum speed of the input polarization fluctuations that are to be compensated, expressed in degree/s as the angle covered on the Poincaré sphere per unit of time, let's assume that the speed of VPR2, $\omega_2$=4°/$T_{step}'$, is twice $\omega_{max}$, namely $\omega_2'$=2·$\omega_{max}$, in order to guarantee an effective polarization fluctuations compensation. During the switching of VPR1 the first stage output SOP moves on the Poincaré sphere at the speed of about $\omega_1$. It results that $\omega_1'$=45$\omega_2'$ (i.e. the VPR1 switching speed is 45 times the VPR2 speed) and that the SOP variation at the first stage output induced by VPR1 switching is 90 times faster than the fastest input SOP variation which can be compensated. The fast SOP variation at the output of the first stage has to be compensated by the second stage, with VPR4 speed $\omega_4$=2·$\omega_1$=180·$\omega_{max}$ and VPR3 switching speed $\omega_3$=90·$\omega_1$=8100·$\omega_{max}$. So there is a severe request on the VPR3 switching speed, which has to be 8100 times the maximum input SOP variation speed that can need to be compensated. It can be also pointed out that the VPR3 switching has to be much faster than the VPR1 switching, hence $T_{step}'$=90·$T_{step}''$. Consequently the VPR1 switching time needs to be much longer than the VPR3 switching time; therefore the first stage is slowed down with respect to the second stage. Therefore, the requested VPR3 switching speed by using the algorithm of the present invention is 45 times less than by using the algorithm of this comparative example.

The present invention finds useful application also in methods and devices for stabilizing the state of polarization of a polarization multiplexed optical radiation, as well in polarization division multiplexing optical communication systems.

The invention claimed is:

1. A polarization stabilizing device for stabilizing the state of polarization of an optical radiation, comprising:
   a first and a second birefringent element having fixed polarization eigenstates and operable to provide in sequence to the optical radiation respectively first and second controllable phase retardation ($\Phi_1$, $\Phi_2$);
   a detecting system apt to generate at least a first monitor signal representative of an optical power of a first polarized portion of the optical radiation output from the second birefringent element;
   a third and a fourth birefringent element having fixed polarization eigenstates and operable to provide respectively third and fourth controllable phase retardations ($\Phi_3$, $\Phi_4$) in sequence to the optical radiation outputting from the second birefringent element; and
   a further detecting system apt to generate a second monitor signal representative of an optical power of a further polarized portion of the optical radiation output from the fourth birefringent element; and
   a controller connected for receiving said first monitor signal from the detecting system and for supplying first and second control signals ($\phi_1$, $\phi_2$), responsive to said first monitor signal, respectively to the first and second birefringent elements so as to control said first and second controllable phase retardations, and connected for receiving said second monitor signal from the further detecting system and for supplying third and fourth control signals ($\phi_3$, $\phi_4$), responsive to said second monitor signal, respectively to the third and fourth birefringent elements so as to control said third and fourth controllable phase retardations;
   the controller being configured:
   to set the second control signal ($\phi_2$) so as to maintain the polarization state of the optical radiation output from the second birefringent element at a defined great circle $\Gamma$ on a Poincare sphere, and, in case the second controllable phase retardation reaches a first limit value, to set the first control signal ($\phi_1$) so as to commute the first controllable phase retardation between first and second values;

and to set the fourth control signal ($\phi_4$) so as to maintain the state of polarization of the optical radiation output from the fourth birefringent element at a defined state of polarization, and to set, in case the fourth controllable phase retardation reaches a second limit value, the third control signal ($\phi_3$) so as to commute the third controllable phase retardation between third and fourth values;

wherein the controller is further configured to set the first control signal ($\phi_1$) so as to keep constant the first controllable phase retardation while the third controllable phase retardation is commuting between said third and fourth values.

2. The device according to claim 1, wherein the controller is configured to set, in case the second controllable phase retardation ($\Phi_2$) reaches a third limit value, the first control signal ($\phi_1$) so as to commute the first controllable phase retardation ($\Phi_1$) between said first and second values, said first and third limit values representing opposite ends of a limited range of variation of the second controllable phase retardation.

3. The device according to claim 2, wherein a width of said limited range is equal to an integer, non-zero, multiple of 180°.

4. The device according to claim 2, wherein the controller is configured to operate in a stepped mode.

5. The device according to claim 4, wherein the controller is configured to set the second control signal so as to vary the second controllable phase retardation by a predetermined quantity, less than 10°, at each step, in case the second controllable phase retardation is comprised between said first and third limit value.

6. The device according to claim 4, wherein the controller is configured to calculate at each step a first error value representative of the deviation of the polarization state of the optical radiation output from the second birefringent element from said defined great circle $\Gamma$.

7. The device according to claim 6, wherein the controller is configured so as, in case the first error value of a current step is greater than the first error value of the preceding step, to change a sign of variation of the second phase retardation.

8. The device according to claim 4, wherein the controller is configured to set the fourth control signal so as to vary the fourth controllable phase retardation by a respective predetermined quantity, less than 10°, at each step, in case the fourth controllable phase retardation is comprised between said second and fourth limit value.

9. The device according to claim 4, wherein the controller is configured to calculate at each step a second error value representative of the deviation of the polarization state of the optical radiation output from the fourth birefringent element from said defined state of polarization.

10. The device according to claim 9, wherein the controller is configured so as, in case the second error value of a current step is greater than the second error value of the preceding step, to change a respective sign of variation of the fourth phase retardation.

11. The device according to claim 2, wherein the controller is configured to use the first control signal to keep the first controllable phase retardation constant at either one of said first and second values, when the second phase retardation is comprised between said first and third limit values.

12. The device according to claim 2, wherein the controller is configured, in case the fourth controllable phase retardation ($\Phi_4$) reaches a fourth limit value, to set the third control signal ($\phi_3$) so as to commute the third controllable phase retardation ($\Phi_3$) between said third and fourth values, said second and fourth limit values representing respective opposite ends of a respective limited range of variation of the fourth controllable phase retardation.

13. The device according to claim 12, wherein a respective width of said respective limited range is equal to an integer, non-zero, multiple of 180°.

14. The device according to claim 12, wherein the controller is configured to use the third control signal to keep the third controllable phase retardation constant at either one of said third and fourth values, when the fourth phase retardation is not at said second and fourth limit value.

15. The device according to claim 2, wherein the controller is configured, during the commutation of the first controllable phase retardation, to stop varying the first controllable phase retardation when the fourth controllable phase retardation ($\Phi_4$) reaches either one of the second and fourth limit value, to commute the third controllable phase retardation ($\Phi_3$) between said third and fourth values, and then to resume the variation of the first controllable phase retardation.

16. The device according to claim 1, wherein the controller is configured to set the second control signal so as to keep constant the second controllable phase retardation while the first controllable phase retardation ($\Phi_1$) is commuting between first and second values.

17. The device according to claim 1, wherein the controller is configured to change a sign of variation of the second controllable phase retardation when the first controllable phase retardation ($\Phi_1$) starts commutation between first and second values.

18. The device according to claim 1, wherein said first and second values are selected so as to cause a commutation of the polarization state transmitted by the second birefringent element between two diametrically opposite positions on the Poincare sphere.

19. The device according to claim 1, wherein said first and second values are spaced apart by an odd integer multiple of 180°.

20. The device according to claim 1, wherein the controller is configured to use the first control signal to commute the first controllable phase retardation when the state of polarization of the optical signal input to the second birefringent element belongs to said defined great circle $\Gamma$.

21. The device according to claim 1, wherein the controller is configured to set the fourth control signal so as to keep constant the fourth controllable phase retardation while the third controllable phase retardation ($\Phi_3$) is commuting between said third and fourth values.

22. The device according to claim 1, wherein said third and fourth values differ by an odd multiple of 180°.

23. The device according to claim 1, wherein the controller is configured to change a sign of variation of the fourth controllable phase retardation ($\Phi_4$) when the third controllable phase retardation ($\Phi_3$) starts commutation between said third and fourth values.

24. The device according to claim 1, wherein the controller is configured to use the third control signal to commute the third controllable phase retardation when the state of polarization of the optical signal input to the fourth birefringent element corresponds to either one of the eigenstates of said fourth birefringent element.

25. The device of claim 1, wherein said first and second birefringent element are respectively a first and a second variable retarder having respective eigenaxes oriented at approximately ±45 degrees relative to each other.

26. The device of claim 1, wherein said third and fourth birefringent element are respectively a third variable retarder and a fourth variable retarder having respective eigenaxes oriented at approximately ±45 degrees relative to each other.

27. A device according to claim 25, wherein the eigenaxes of the third variable retarder are oriented at ±45° with respect to the eigenaxes of the first variable retarder.

28. The device of claim 1, wherein said first and second birefringent element are respectively a first and a second variable polarization rotator; and wherein the device further comprises a quarter-wave plate optically interposed between the first and the second variable polarization rotator and having eigenaxes oriented at respectively +45-δ degrees and −45-δ degrees to a defined azimuth, wherein δ is a fixed arbitrary value expressed in degrees and said defined state of polarization has said defined azimuth.

29. The device according to claim 1, wherein said third and fourth birefringent element are respectively a third and a fourth variable polarization rotator; and wherein the device further comprises a further quarter-wave plate optically interposed between the third and the fourth variable polarization rotator and having eigenaxes oriented at respectively +45-δ' degrees and −45-δ' degrees to said defined azimuth, wherein δ' is a further arbitrary fixed value expressed in degrees.

30. The device according to claim 1 wherein said optical radiation is a polarization multiplexed optical radiation comprising an identified channel which is provided with a pilot signal and wherein said detecting system is responsive to said pilot signal, said first polarized portion belongs to said identified channel and the SOP of said identified channel output from the second birefringent element is at said defined great circle Γ.

31. An optical polarization demultiplexer comprising the polarization stabilizing device of claim 30 and a polarization division demultiplexer, located, with respect to a direction of propagation of the optical radiation input into the device, downstream the polarization stabilizing device and oriented parallel or perpendicular to said defined state of polarization.

32. A polarization division multiplexing system comprising: a polarization transmitter comprising a polarization multiplexer apt to combine a first and a second optical channel having orthogonal polarization; a transmission line apt to propagate said combined first and second optical channel; and an optical polarization demultiplexer according to claim 30, optically coupled to said transmission line, and apt to separate said first and second optical channel, wherein the first channel comprises said pilot signal.

33. A method of stabilizing the state of polarization of an optical radiation, the method comprising:
1) applying sequentially to the optical radiation a first and a second controllable phase retardation;
2) detecting an optical power of at least a first polarized portion of the optical radiation obtained after step 1;
3) applying sequentially to the optical radiation obtained after step 1 a third and a fourth controllable phase retardation;
4) detecting an optical power of a further polarized portion of the optical radiation obtained after step 3;
5) controlling, responsive to the optical power of said first polarized portion, the second controllable phase retardation so as to maintain the polarization state of the optical radiation obtained after step 1 at a defined great circle Γ on a Poincaré sphere;
6) in case the second controllable phase retardation reaches a first limit value, commuting the first controllable phase retardation between first and second values;
7) controlling, responsive to the optical power of said further polarized portion, the fourth controllable phase retardation so as to maintain the polarization state of the optical radiation obtained after step 3 at a defined state of polarization;
8) in case the fourth controllable phase retardation reaches a second limit value, commuting the third controllable phase retardation between third and fourth values, and keeping constant the first controllable phase retardation while the third controllable phase retardation is commuting between said third and fourth values.

34. The method of claim 33, wherein, in case the second controllable phase retardation reaches a third limit value, the first controllable phase retardation is commuted between said first and second values, said first and third limit values representing opposite ends of a limited range of variation of the second controllable phase retardation.

35. The method of claim 34, wherein the second controllable phase retardation is stepwise varied by a predetermined quantity, less than 10°, at each step, in case the second controllable phase retardation is comprised between said first and third limit value.

36. The method of claim 33, wherein the second controllable phase retardation is kept constant while the first controllable phase retardation is commuting between first and second values.

37. The method of claim 33, wherein a sign of variation of the second controllable phase retardation is toggled when the first controllable phase retardation starts commutation between first and second values.

38. The method of claim 33, wherein the first controllable phase retardation is kept constant at either one of said first and second values, when the second phase retardation is comprised between said first and third limit values.

39. The method of claim 33, wherein in case the fourth controllable phase retardation reaches a fourth limit value, the third controllable phase retardation is commuted between said third and fourth values, said second and fourth limit values representing respective opposite ends of a respective limited range of variation of the fourth controllable phase retardation.

40. The method of claim 39, wherein the fourth controllable phase retardation is stepwise varied by a respective predetermined quantity, less than 10°, at each step, in case the fourth controllable phase retardation is comprised between said second and fourth limit value.

41. The method of claim 33, wherein said optical radiation is a polarization multiplexed optical radiation comprising an identified channel which is provided with a pilot signal, and wherein said first polarized portion belongs to said identified channel, said further polarized portion belongs to said identified channel and the SOP of said identified channel output from the device is at said defined state of polarization.

42. A method of demultiplexing a polarization multiplexed optical radiation, the method comprising the method of claim 41 and further comprising separating the identified channel in the second transformed optical radiation from a further channel orthogonally polarized to the identified channel.

43. A method of transmitting a polarization multiplexed optical signal, the method comprising:
providing a pilot signal to an optical channel to generate an identified channel;
polarization multiplexing the identified channel with a further channel at a first location to generate a polarization multiplexed optical radiation;

propagating said polarization multiplexed optical radiation at a second location different from the first location;

stabilizing the state of polarization of the polarization multiplexed optical radiation at the second location according to claim 41 to generate a polarization stabilized optical radiation;

separating the identified channel of the polarization stabilized optical radiation from the further channel; and detecting at least one of said identified and further channel.

* * * * *